United States Patent [19]

Nobusawa

[11] 4,035,814

[45] July 12, 1977

[54] ELECTRONIC FLASH APPARATUS CONTROLLED BY A DIGITAL MEMORY SYSTEM

[75] Inventor: Tsukumo Nobusawa, Minami Oizumi, Japan

[73] Assignee: Asahi Kogaku Kogyo Kabushiki Kaisha, Japan

[21] Appl. No.: 608,729

[22] Filed: Aug. 28, 1975

[30] Foreign Application Priority Data

| | | |
|---|---|---|
| Sept. 2, 1974 | Japan | 49-99925 |
| Sept. 12, 1974 | Japan | 49-105242 |
| Dec. 21, 1974 | Japan | 49-147013 |
| June 27, 1975 | Japan | 50-79436 |

[51] Int. Cl.[2] ............ G03B 7/16

[52] U.S. Cl. ............ 354/33; 354/23 D; 354/27; 354/60 A; 354/60 F; 354/128; 354/139; 354/149

[58] Field of Search ............ 354/23 D, 27, 32, 33, 354/35, 60 A, 60 F, 139, 129, 145, 149, 128; 315/149, 151, 157

[56] References Cited

U.S. PATENT DOCUMENTS

| | | | |
|---|---|---|---|
| 3,348,462 | 10/1967 | Fahlenberg | 354/23 D |
| 3,709,123 | 1/1973 | Tokutomi | 354/32 |
| 3,748,979 | 7/1973 | Wada | 354/23 D |
| 3,832,723 | 8/1974 | Nickel | 354/23 D |
| 3,875,471 | 4/1975 | Buck | 354/33 |

FOREIGN PATENT DOCUMENTS

| | | | |
|---|---|---|---|
| 2,256,749 | 6/1974 | Germany | 354/23 D |

*Primary Examiner*—Russell E. Adams
*Attorney, Agent, or Firm*—Steinberg & Blake

[57] ABSTRACT

An electronic flash apparatus to be used for photographing purposes and controlled by a digital memory system. A flash structure provides flash illumination while an oscillator circuit produces pulses the frequency of which is determined according to a factor such as the light intensity or the distance of the object from the flash apparatus, and these pulses are counted by a memory device which is set to terminate the counting of the pulses according to one or more parameters such as the film speed, the diaphragm aperture, or the like. The flash illumination is terminated by a flash control structure actuated either according to the number of pulses counted or according to the time interval required to count a given number of pulses.

20 Claims, 24 Drawing Figures

ELECTRONIC FLASH APPARATUS CONTROLLED BY A DIGITAL MEMORY SYSTEM

BACKGROUND OF THE INVENTION

The present invention relates to electronic flash apparatus utilized for photographing purposes.

As is well known, it is necessary to control the operation of an electronic flash apparatus so as to regulate the amount of flash illumination provided thereby so as to achieve a proper film exposure. In general, the extent of flash illumination provided by conventional electronic flash apparatus is determined according to two different types of systems, namely a parallel system or a series system. According to the parallel system, flash illumination is terminated by way of switching "ON" or closing a switching means connected in parallel with the flash discharge tube, while according to the series system termination of the flash illumination is made by turning "OFF" or opening a switching means connected in series with the flash discharge tube. With either of these systems, the switching means is controlled by way of analog types of control circuits. For example, a conventional arrangement will include an integrator circuit having a light-sensitive element receiving light reflected from the object, the circuit also including a capacitor connected in series with the light-sensitive element so that when the integrating operation of the circuit reaches a given value an output signal is produced which provides the ON or OFF control for the switching means.

Analog controls of the above type, however, are undesirably influenced by fluctuation of source voltage as well as variations in ambient temperature. In addition, the integrating time of the integrating circuit requires on the order of tens of microseconds, so that the output signal (integration signal) appearing as a voltage across the capacitor is highly unstable. For these reasons, it has been difficult with conventional apparatus to achieve accurate flash control.

SUMMARY OF THE INVENTION

It is a primary object of the present invention to provide for an electronic flash apparatus control circuitry which will avoid the above drawbacks.

More specifically, it is an object of the present invention to utilize a digital memory system according to which pulses are counted by a memory device so as to achieve in this way proper control of a switching means which may be connected either in parallel or in series with the flash discharge tube.

In addition, it is an object of the present invention to provide circuitry of this type which can be readily adapted in an extremely simple manner for incorporating into the controls such parameters as the setting of the diaphragm or the sensitivity of the film which is exposed.

Thus, it is an object of the present invention to provide a flash control which utilizes digital circuits so that the duration of flash will not fluctuate according to variation of source voltage or ambient temperature.

Also it is an object of the present invention to achieve accurate exposure with flash illumination without the drawback of requiring the use of a capacitor as is utilized in a conventional integrator circuit wherein accurate controls cannot be achieved because of unavoidable leakage.

A further object of the present invention is to provide a structure of the above type capable of operating with extremely high pulse frequencies so that accurate flash control can be achieved even when the interval between starting and stopping of the flash must be extremely short.

Yet another object of the present invention is to provide a flash apparatus which is capable of indicating to the operator a condition such as the fact that the flash illumination which is provided does not extend sufficiently to the object which is to be photographed so that the operator will then know that the conditions must be changed such as, for example, by locating the electronic flash apparatus closer to the object which is to be photographed.

It is also an object of the present invention to provide circuitry which enable adjustments to be very effectively carried out in such a way that a highly effective control of the duration of flash illumination required for proper exposure can be achieved while at the same time taking into account in a simple effective manner such parameters as diaphragm setting, film speed, etc.

According to the invention the electronic flash apparatus is capable of terminating the flash illumination with the extent of flash illumination being controlled by a means for determining pulse frequency of an oscillator according to the distance between the object and the flash apparatus, a digital memory being provided to count the pulses provided by the oscillator so that the output of this memory will be utilized to terminate the operation of the flash discharge tube.

It is also possible in accordance with the invention to utilize a system according to which there is preliminary flash as well as a main flash, with the latter being used during actual film exposure, with the preliminary flash illumination being utilized to achieve the required controls. Thus, during the preliminary flash illumination it is possible to determine the frequency of pulses produced by an oscillator with the memory device counting and memorizing a given number of pulses provided during the preliminary flash. Then during the main flash illumination, reference pulses are produced and compared with the previously memorized number of pulses. When the references pulses have a given relationship with respect to the previously memorized pulses from the preliminary flash, a signal is provided to terminate the flash illumination.

Thus, the output signal from the digital memory device or from the comparison circuit is produced at a time which is dependent upon the pulse frequency in such a way that when light reflected from the object is relatively intense the duration of flash illumination is relatively short while when the light reflected is weak the duration of flash illumination is relatively long. Thus, by controls of this type a switchng means connected either in parallel or in series with the discharge flash can be actuated in order to provide the flash controls required for proper exposure.

More specifically, according to the invention the electronic flash apparatus includes a flash means for providing flash illumination and an oscillator means for providing pulses during operation of the flash means. A counting means is provided for counting these pulses and a terminating means is provided for selectively terminating operation off the counting means according to parameters such as film speed, the diaphragm aperture, etc. A flash control means is operatively connected with the flash illuminating means for controlling the extent of flash illumination provided thereby, and the above counting means and terminating means form a pair of means one of which is connected to the flash control means for operating the latter to regulate the extent of flash illumination provided by the flash means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
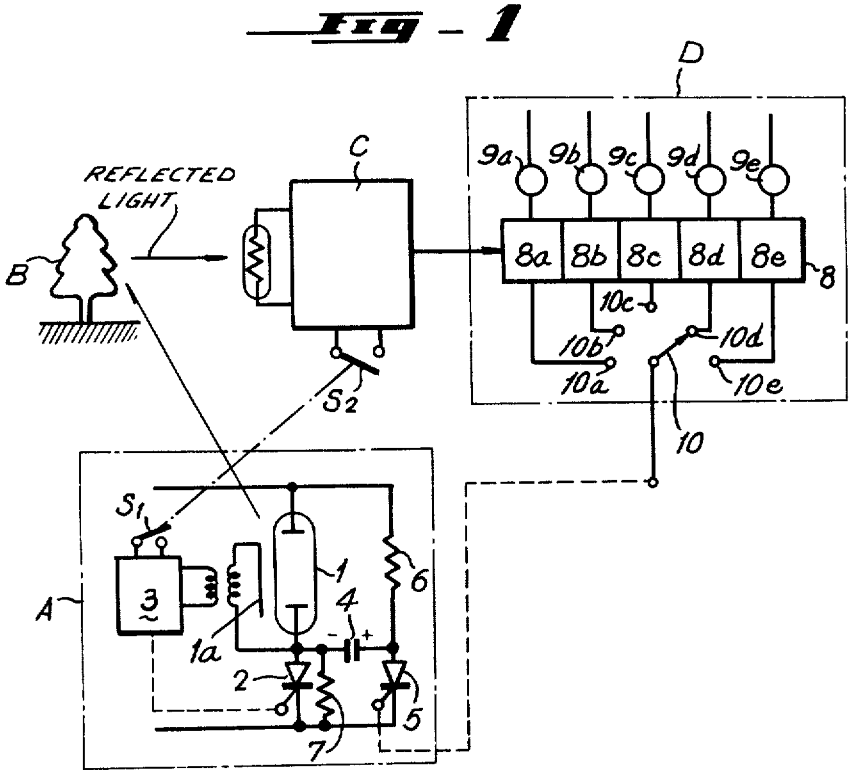
FIG. 1 is a schematic representation of one embodiment of the invention according to which controls are achieved by pulses at a frequency directly proportional to light intensity.

Referring first to FIG. 1, the electronic flash apparatus of the invention illustrated therein includes a flash means A which in itself is conventional and is capable of providing flash illumination. FIG. 1 also diagrammatically illustrates an object B which is the object to be photographed under conditions where the light available must be augmented by flash illumination to achieve a proper exposure. As is diagrammatically represented in FIG. 1, the flash illumination provided by the flash means A will be reflected at least in part together with whatever available light is present from the object B to a photosensitive oscillator means C which in the example of FIG. 1 responds automatically to provide pulses at a frequency which is directly proportional to the intensity of the reflected light received by the oscillating means C. The pulses provided by the oscillator means C are counted by a counting means 8 forming part of the unit D illustrated in FIG. 1, and operatively connected to the counting means 8 is a terminating means 10 for terminating the operation of the counting means 8 in a manner described below. This terminating means 10 is capable of being preset by the operator according to one or more parameters such as diaphragm aperture, film speed, etc. A flash control means formed in part by the dotted line conductor shown interconnecting means 10 with the flash means A in FIG. 1 is provided to respond to terminating of the operation of the counting means 8 so as to terminate automatically the operation of the flash means A.

The flash means A of FIG. 1 includes a discharge tube 1 which when energized will provide flash illumination in a well known manner. In the example of FIG. 1 an SCR 2 is connected in series with the flash discharge tube 1 and serves as a switching element connected in series with a main capacitor which is not illustrated in FIG. 1 but which is conventional. As was pointed out above, the entire flash means A is conventional. The flash means includes an exciting electrode 1a which receives a high-voltage pulse from a trigger circuit 3, with SCR 2 receiving simultaneously a gate signal from circuit 3 so as to start the discharge operation of the flash discharge tube 1, thus creating flash illumination in this way.

The flash control means for terminating operation of the flash illumination includes in the example of FIG. 1 a commutation capacitor 4 and an SCR 5. Prior to initiation of flash illumination, the commutation capacitor 4 is charged through the charging resistors 6 and 7 with the polarity illustrated in FIG. 1. Therefore, when, during flash discharge, the SCR 5 is turned ON receiving a gate signal from the terminating means 10 which terminates operation of the counting means 8, the charging voltage of the commutation capacitor 4 reverse-biases SCR 2 turning the latter OFF, so that energizing of flash discharge tube 1 is terminated, and thus flash illumination is terminated.

In the manner set forth above light from the object B is received by the photosensitive oscillator means C which generates pulses at a frequency which is directly proportional to the intensity of the reflected light. In other words, when oscillator means C receives light of relatively high intensity the interval from one pulse to the next is relatively short while at low light intensities the interval from one pulse to the next is relatively long.

Figure 2:
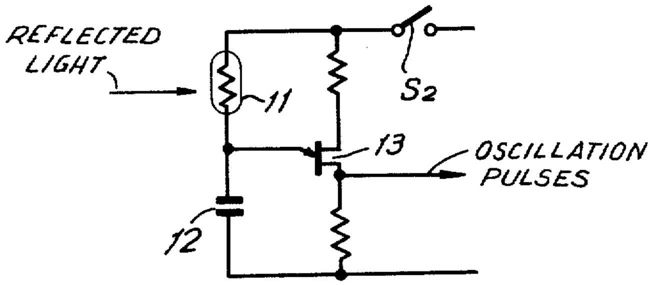
FIGS. 2–7 respectively illustrate different embodiments of oscillator circuits capable of being used in the embodiment of FIG. 1 for providing pulses.

Thus the pulses generated by the oscillator means C will have a repeating period which is inversely proportional to the intensity of the reflected light with the frequency of the pulses being directly proportional thereto. The oscillator means C may, for example, be a UJT oscillator as illustrated in FIG. 2. Inasmuch as the time during which flash illumination is provided is extemely short, it is desirable to use as a photosensitive element for the oscillator means an element of high sensitivity such as, for example, a photodiode.

The counting means 8 which counts the pulses may take the form of binary counter having counter elements 8a-8e. In the illustrated example output ends of these counting elements are respectively connected with indicating lamps 9a-9e as well with terminals 10*a*–10*e* one of which is selectively engaged by the terminating means 10. Thus, the terminals 10*a*–10*e* together with the element 10 form a change-over switch through which a gate signal is supplied to SCR 5 of the flash control means. The lamps 9*a*–9*e* when illuminated are visible to the operator and serve as an indicating means for indicating to the operator the operation of the counting elements of counting means 8 for a purpose referred to below.

The trigger circuit 3 is energized upon closing of a switch S1 while the oscillator C is energized upon closing of a switch $S_2$. These swiches are connected together so as to be simultaneously closed thus simultaneously triggering the operation of trigger circuit 3 and oscillator means C. Assuming that the electronic flash apparatus is operatively connected with a camera either by forming a permanent part thereof or by being operatively connected therewith, then the switches $S_1$ and $S_2$ will be automatically closed in response to depression of the shutter-tripping plunger of the camera, these switches $S_1$ and $S_2$ being operatively connected in a known way to the shutter-tripping plunger so that when the latter is depressed to open the shutter and make an exposure the switches $S_1$ and $S_2$ are closed in synchronism with the opening of the shutter. Thus, in this way the flash means A will energize tube 1 so that the latter provides the flash illumination and at the same time the oscillator means C receives light reflected from the object B and generates pulses at a frequency directly proportional to the intensity of the reflected light, these pulses being counted by the counting means 8. If, for example, eight pulses are counted, an output will appear at the terminal 10*d*. This output is then supplied by way of the terminating means 10 to the flash control means which includes the SCR 5, so that as soon as the element 8*d* of the counting means responds in this example to the counting of eight pulses, the operation of the counting means terminates and the flash control means is operated by the terminating means 10 to terminate the operation of the flash means since at this time SCR 5 will be turned ON thus turning SCR 2 OFF in order to terminate the energizing of the flash tube 1.

Thus, with this particular embodiment of the invention the discharge time duration of the flash tube 1 is determined by the time required for the counting means 8 to count the number of pulse determined by the setting of the terminating means 10 which terminates the operation of the counting means 8. It is apparent that when the light intensity is relatively great the required number of pulses will be counted in a shorter time than when the light intensity is relatively small, so that a short discharge time for the flash tube 1 is provided at high light intensities and a longer discharge time for the flash tube 1 is provided for relatively small light intensities. Inasmuch as the duration of operation of the flash tube 1 is automatically controlled in this manner, it is possible to obtain an extent of flash discharge required for proper exposure by selecting a a suitable setting for the terminating means 10 which terminates the operation of the counting means 8. Thus, the switch element 10 will be placed in engagement with a selected one of the terminals 10a-10e according to parameters such as the setting of the diaphragm aperture, the sensitivity of the film which is exposed, and the selected exposure time. Any one or any combination of these parameers may be utilized to determine the setting of the terminating means 10. While it is assumed that the above photographic parameters such as shutter speed, diaphragm setting, and film speed are constant, if it is desired to set the diaphragm at a selected aperture then the change-over switch 10 may be set in accordance with the selected aperture of the diaphragm.

The several indicating lamps 9*a*–9*e* are provided to indicate to the operator the degree of intensity of the reflected light. For example, in the case where eight pulses are produced by the oscillator means C and are counted by the counting means 8, then the indicating lamp 9*d* will become illuminated so that the operator will know that the extent of flash illumination provided by the tube 1 has been sufficient to reach the objects B. If on the other hand the reflected light is so weak that the counter 8 counts only four pulses, then the indicating lamp 9*c* will become illuminated but not the indicating lamp 9*d*, so that the operator will know that insufficient flash illumination has been provided since by setting the terminating means 10 at a contact 10*d* the operator knows that the light must be sufficient to energize the lamp 9*d* in order to achieve a proper exposure. Therefore, in this case the indicating means formed by the lamps 9*a*–9*e* will indicate to the operator that the conditions are not proper for achieving a good film exposure, and the operator will know that the exposure must be repeated with the flash apparatus situated closer to the object so that sufficient illumination will reach the object to provide a proper exposure. Thus if it should happen that the operator has positioned the flash apparatus too far from the object to achieve a proper exposure, the indicating means 9*a*–9*e* will indicate this fact to the operator so that by way of this indicating means the operator knows that he must approach more closely to the object which is to be photographed.

In connection with exposure with flash illumination, it is often extremly difficult to measure accurately by eye the distance to the object particularly because of the low illumination of the object. For this reason a situation where insufficient light from the flash reduces the object often occurs with a resulting underexposure. Under the above circumstances where with the illustrated example eight pulses will be required to be counted by the counting means 8, if any of the indicating lamps 9*a*, 9*b*, or 9*c* becomes illuminated or if none of the indicating lamps are illuminated, the operator will know that insufficient illumination has been provided by the flash means and that a proper exposure will not be achieved unless the exposure is repeated with the flask located closer to the object.

In addition, it is to be noted that the particular lamp which is illuminated will given an indication of the extent to which the position of the flash means should be changed. For example if under the above circumstances the indicating lamp 9*b* is illuminated, the operator will know, for example, by how many meters or centimeters it is necessary to approach the object so as to provide a proper exposure.

FIGS. 2–7 illustrate various possible embodiments for the oscillator means C. In FIGS. 2–7 the same elements are indicated by the same reference characters.

Thus, FIG. 2 illustrates a well-known UJT oscillator where the junction between photosensitive means 11 and capacitor 12 is connected to the emitter of UJT 13. The oscillation pulses are achieved from the first base of UJT 13. Of course these pulses are trasmitted to the counting means 8 to be counted thereby. According to the embodiment of FIG. 3 it is possible to alter the frequency of the light-responsive pulses according to a parameter such as the diaphragm setting or film speed. As is apparent from FIG. 3 in the event that there is no reflected light the transistor 14 is in a non-conductive or OFF state. When the photosensitive means 11 receives reflected light, transistor 14 is turned ON, thus casing transistor 15 to be turned ON. Then UJT 13 will start oscillating as a result of the charging voltage of one of the capacitors 16*a*, 16*b*, or 16*c*. These capacitors have different capacitances respectively, so that by selecting one of these capacitors by way of a change-over switch $S_3$, it is possible to alter the frequency of the pulses provided by UJT 13, and thus it is possible to regulate the time required to count the given number of pulses by the counting means 8 in accordance with a factor such as diaphragm aperture, film speed, or the like. The arrangement can be such that the switch $S_3$ is connected to the structure which sets a film-speed scale to a given value while the change-over switch 10 is connected with the structure which sets the diaphragm of the camera. Thus is this case the particular one of the terminals 10a-10e engaged by the terminating means 10 for terminating the operation of the counting means 8 will be determined in accordance with the diaphragm setting while the particular one of the capacitors 16*a*–16*c* connected to the switch $S_3$ will be determined according to the film speed. In the event that a highly sensitive film is utilized, a relatively short duration of operation for the flash tube 1 will be sufficient so that in this case a capacitor of a smaller capacitance is selected to achieve shorter intervals between the pulses or in other words a higher frequency.

Figure 3:
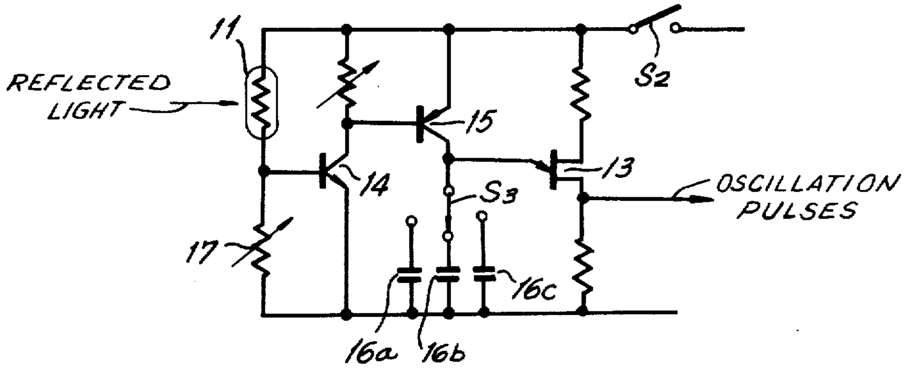

The variable resistor 17 of FIG. 3 may be replaced by a logarithmic compression element such as a diode. With such an arrangement the binary counter 8 may be in the form of a shift register.

If, due to the extremely short duration of flash discharge the base-emitter voltage $V_{BE}$ of transistor 14 of FIG. 3 comes into question, then a battery may be connected in series with the variable resistor 17.

Figure 4:
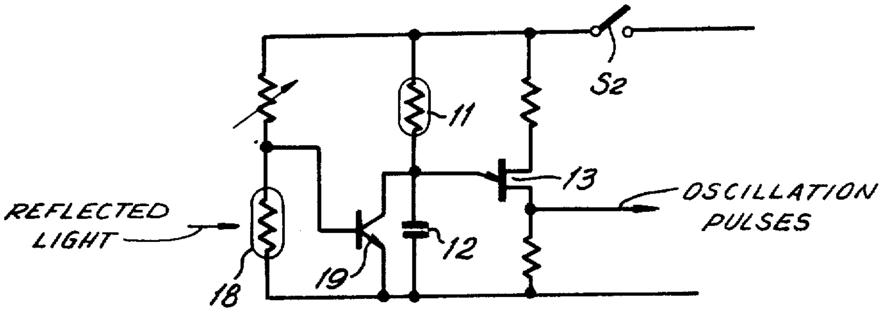

The embodiment of the oscillating means which is shown in FIG. 4 includes in addition to the photosensitive element 11 for determining the pulse frequency a further photosensitive element 18 for starting the oscillating operation. In the event that there is no reflected light. the transistor 19 of FIG. 4 will be in its conductive ON state, so that capacitor 12 is not charged and there are no oscillations. When the light sensitive element 18 receives reflected light, however, transistor 19 is turned OFF so that in response to the charging voltage of capacitor 12 UJT 13 will start oscillating. Therefore, by utilizing a pair of photosensitive means 11 and 18 in the circuit of FIG. 4 the circuit arrangement is simplified. A base-bias battery for the transistor is not required and the characteristic of photosensitive means 11 can be determined independently of the starting condition of oscillation.

Figure 5:
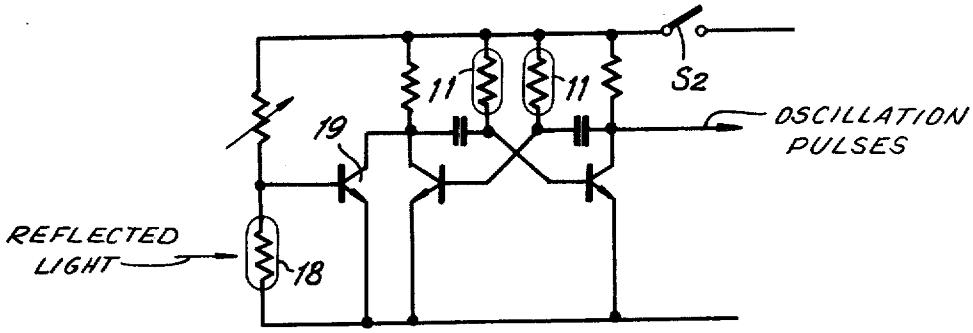

FIG. 5 shows an embodiment where an astable multivibrator is utilized as the photosensitive oscillator means C. Thus it will be seen that this embodiment corresponds in general to the embodiment of FIG. 4 except that the astable multivibrator includes a pair of photosensitive elements 11.

Figure 6:
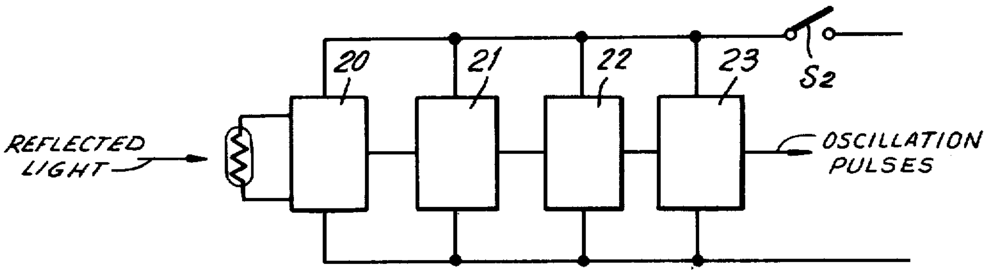

FIG. 6 illustrates an embodiment where a well-known sine wave oscillator is utilized. This oscillator includes a photosensitive light-receiving unit 20, a sine-wave oscillator 21, a pulse-shaping unit 22, and a differentiator 23.

Figure 7:
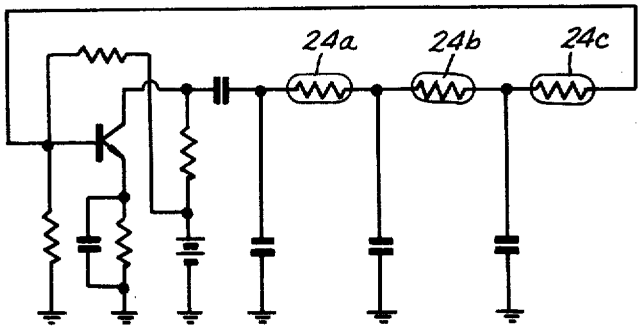

In connection with FIG. 7 it will be seen that the sine-wave oscillator 21 may be formed by replacing resistors of an RC sine-wave oscillator with the photosensitive elements 24*a*, 24*b*, and 24*c*.

It is to be noted in connection with FIGS. 6 and 7 that a sine-wave oscillator is of advantage for a light-responsive oscillator means C inasmuch as this construction is a readily available high-frequency oscillator which operates in a highly stable manner. An LC oscillator may be effectively employed as a sine-wave oscillator, and of course other types of oscillators may be employed.

Figure 8:
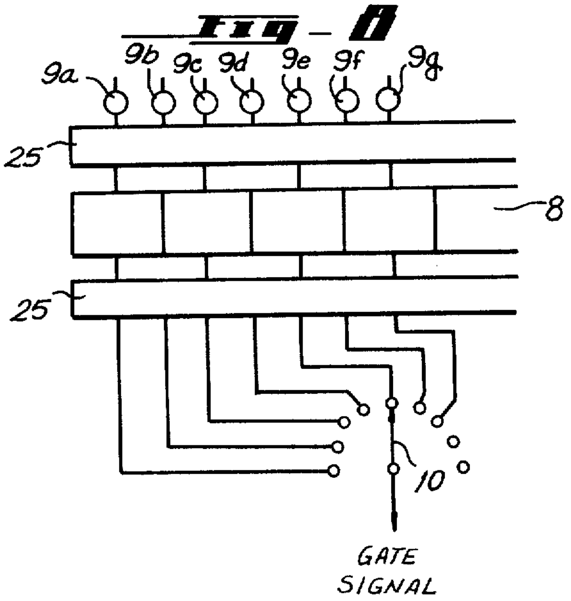
FIG. 8 is a fragmentary schematic illustration of a different embodiment of a counting means capable of being used in place of the counting means of FIG. 1.

FIG. 8 shows a modification of the unit D of FIG. 1. According to the embodiment of FIG. 8 a decoder 25 is connected with the binary counter 8 so as to convert the binary numbers into decimal numbers. With this embodiment an output is achieved each time a pulse is supplied so that a finer or more minute flash-terminating control can be achieved than with the embodiment of FIG. 1 wherein a binary counter 8 is utilized by itself.

Thus, with all of the above-described embodiments the pulse frequency is determined in accordance with the light reflected from the object. As is apparent from the above the particular frequency which is provided varies in direct proportion to the intensity of the reflected light received by the photosensitive oscillating means. In the embodiment of FIGS. 9–13 described below, however, the frequency of oscillation is selected in accordance with the distance of the object from the flash means, and in some of these embodiments the selected pulse frequency may be manually provided.

Figure 9:
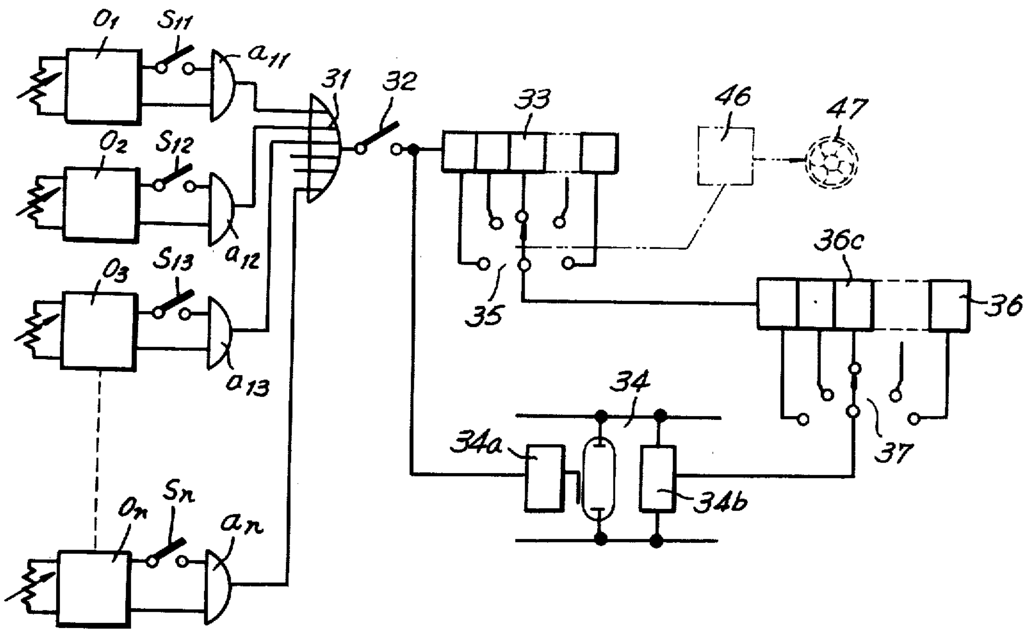
FIG. 9 is a schematic representation of another embodiment of the invention in which pulse frequency is determined in accordance with the distance of the object from the flask apparatus.

Referring to FIG. 9, it will be seen that this embodiment does not include any photosensitive oscillating means to receive reflected light from the object. Instead the embodiment of FIG. 9 includes a plurality of pulse oscillators $O_1$, $O_2$, $O_3$ . . . $O_n$ which respectively have different oscillating frequencies, and one of these oscillators is selected in accordance with the frequency thereof. The frequency is selected in accordance with the distance between the object and the flash means, and the several oscillators may be arranged in stages for facilitating selection according to the distance of the object. For example, oscillators $O_1$, $O_2$, and $O_3$ will have oscillating frequencies $f_1$, $f_2$ and $f_3$ respectively, corresponding to distances of the object from the flash means of 1 mm, 2mm and 3 mm, respectively. The several oscillators are respectively provided with operating switches $S_{11}$, $S_{12}$, $S_{13}$ . . . $S_n$, so that the operator can by closing one of the switches select that one of the oscillators which will provide a frequency in accordance with the distance of the object as measured by the eye of the operator. In the example of FIG. 9 the output of each oscillator is supplied to a frequency divider 33 by way of the several AND circuits $a_{11}$, $a_{12}$, $a_{13}$ . . . $a_n$, and OR circuit 31 and a trigger switch 32. The output of OR circuit 31 is also supplied to a trigger circuit 34*a* which energizes the discharge tube of the flash means 34. The output of the frequency divider 33 is provided with a rotary selecting switch 35 which may be set according to the diaphragm setting of the camera, for example. Thus FIG. 9 shows in phantom lines the adjustable diaphragm 47 of the camera. In response to adjusting the diaphragm 47 a suitable driver 46 is automatically operated, this driver being connected to the change-over switch element of the switch 35 for connecting the change-over switch element to one of the output terminals of the frequency divider 33, so that through this expedient it is possible to set the rotary switch element 35 automatically. From the switch 35 pulses are transmitted to the counting means 36, the several stages of which are connected to terminals one of which is contacted by a change-over element of the switch 37, this change-over element forming the terminating means for terminating the operation of the counting means 36 for transmitting a signal to the flash-control means 34*b* which terminates the operation of the flash, or in other words brings about extinguishing of the discharge of the flash tube, for example in the manner described above in connection with FIG. 1. Thus, by way of the rotary switch 37 the operator can select the number of pulses to be counted by the counter 36, and of course this unit 37 can be set in accordance with a parameter such as film speed, in the case where the element 35 is set in accordance with the aperture of the diaphragm.

With the embodiment of FIG, 9, prior to energizing of the flash tube of the flash means 34, all of the oscillators are set into operation and one of them is selected by closing one of the switches $S_{11}$, $S_{12}$ . . . Assuming, for example, that the distance of the object from the camera is estimated to be 1 m, as measured by eye, and that the oscillator $O_1$ corresponds to this distance, then under these conditions the operator will close the switch $S_{11}$. The switch 32 is connected through a suitable motion transmission with the shutter-tripping plunger of the camera so that when this plunger is manipulated to trip the shutter the switch 32 is simultaneously closed in synchronism with the opening of the shutter. Thus under these conditions if, for example, the switch $S_{11}$ has been closed, pulse signals from oscillator $O_1$ will be supplied to the frequency divider 33 and simultaneously to the trigger circuit 34*a* for energizing the flash tube. The first pulse delivered to the trigger circuit 34*a* will start operation of the flash means by energizing the flash tube thereof. At the same time, the pulse signal is converted by the frequency divider 33 into a frequency which corresponds to the diaphragm setting, and then at this frequency the signal is transmitted to the counting means 36. When a given number of pulses have been counted, as for example, when the number of pulses is sufficient to provide an output at the element 36*c* in the setting of FIG. 9, then the terminating means 37 will respond to terminate the operation of the counting means 36 while at the same time controlling the flash control means 34*b* to bring about a termination in the energizing of the flash tube, so that flash illumination will now terminate.

Thus, the extent of flash illumination is determined according to the time interval required for the counter 36 to count the number of pulses which will transmit a signal to the flash-control means 34*b* through the terminating means 37 which terminates the operation of the counting means 36. This number of pulses is of course dependent upon the oscillating frequency $f_1$ of oscillator $O_1$ in the above example. Of course, if the operator estimates by eye that the distance to the object is 2 m, then the switch $S_{12}$ will be closed in order to select the oscillator $O_2$ for operation under these conditions. In this case also the starting and stopping of flash illumination is carried out in the above described manner, but the frequency $f_2$ provided for the pulses of the oscillator $O_2$ is less than the frequency $f_1$ of the oscillator $O_1$, so that the time required for given number of pulses to be counted by the counting means 36 will be longer under these conditions. Therefore, the duration of flash illumination will be increased under these conditions to provide a proper exposure for the distance of 2 m of the object from the flash apparatus. Thus, with this embodiment it will be noted that the frequencies of the several oscillating units very inversely with respect to the distance of the object from the flash means, with higher frequencies being provided for smaller distances. This of course is in contrast with the embodiment of FIG. 1 where the frequency of the oscillating means is directly proportional to the light intensity reflected from the object.

Of course, with the embodiment of FIG. 9 similar operations are made in connection with distances of the object from the flash means of 3 *m*, 4 *m*, 5 *m*, . . . where the successive oscillators $O_3$ . . . will be selected with the successive frequencies respectively having the relationship $f_3 > f_4 > f_5 > \ldots > f_n$. In this way the extent of flash illumination will be determined according to the distance of the object from the flash means.

Of course, the adjustment is made in such a way that the time required for the counting means to count the given number of pulses required to produce the flash-terminating signal will be a proper time interval of flash duration as determined experimentally in accordance with the different positions of the means 37 which terminates operation of the counting means 36 and which transmits to the flash-control means 34*b* the signal for terminating the energizing of the flash tube. In accordance with the experimental determination of the location of the change-over switch 37, this switch may be set in accordance with the film speed, as pointed out above.

The control means 34*b* for terminating the discharge of the flash tube may be a bypass system wherein a switch is connected in parallel with the discharge tube to bypass the latter and thus terminate the energizing of the flash tube or a current-stopping system may be provided wherein a switch is connected in series with the discharge flash tube. It is also possible to provide a chemical material which has a light-interrupting characteristic due to the application of voltage (a Kerr cell), such a material being situated in front of the flash discharge tube.

Figure 10:
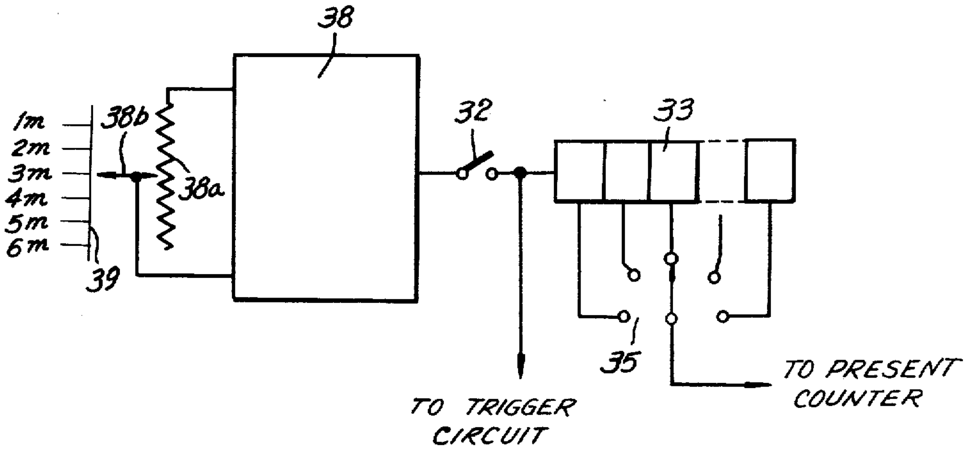
FIG. 10 is a schematic illustration of another embodiment of an oscillator means capable of being used in place of the oscillator means of FIG. 9.

According to the embodiment of FIG. 10, instead of providing separate pulse oscillators one of which is selected as described above in connection with FIG. 9, a single oscillator 38 is provided but has connected thereto an adjusting means for adjusting the oscillator to provide the selected pulse frequency according to the distance of the object from the flash means. Thus as is indicated in FIG. 10, the frequency of oscillator 38 will vary according to $f_1 > f_2 > f_3 \ldots > f_n$ as the pointer or slider 38*b* of a variable resistor 38*a* is set according to the distance scale 39. Therefore, in the same way as in the case of FIG. 9 it is possible with the embodiment of FIG. 10 to achieve different extents of flash illumination according to the distance of the object from the flash means.

Figure 11:
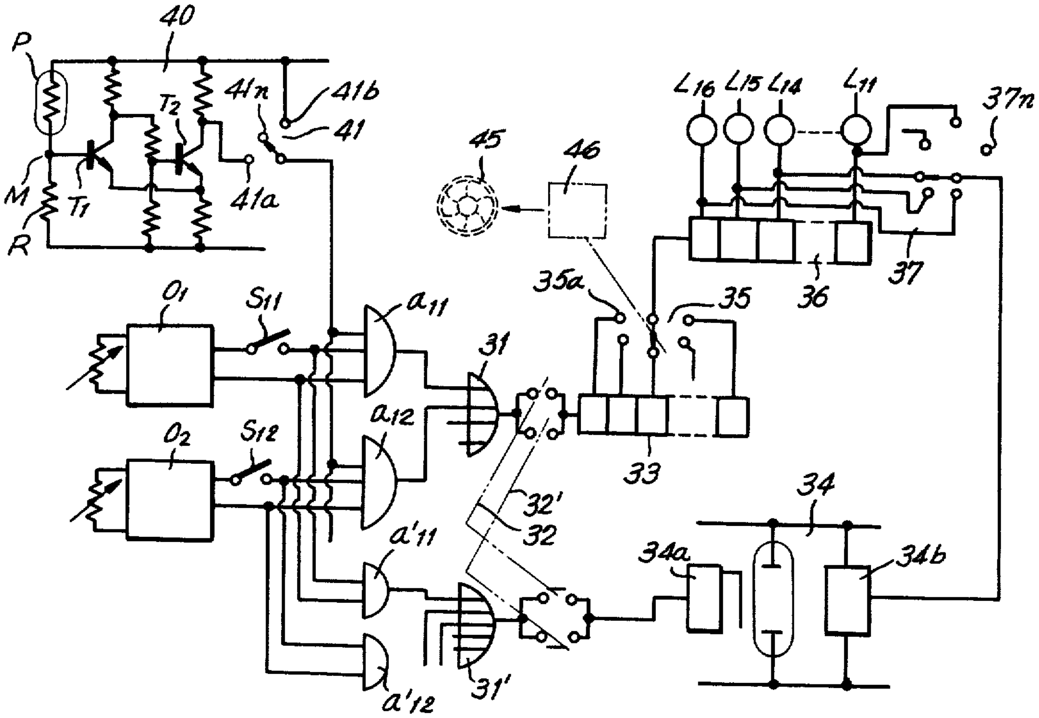
FIG. 11 is a schematic representation of an embodiment similar to that of FIG. 9 but which includes structure for indicating to the operator the proper pulses frequency.

The embodiment of FIG. 11 shows a variation of the embodiment of FIG. 9 according to which there is an additional indicating means for indicating when the distance of the object from the flash means has been properly determined. While in the case of FIG. 9 the distance from the object is measured by eye and a corresponding pulse oscillator is selected in accordance with this estimated distance, with the embodiment of FIG. 11 there are indicating lamps which indicate the distances, and prior to exposure of the film during a main flash operation, there is a preliminary flash operation with light reflected during this preliminary flash operation being utilized to illuminate an indicating lamp which will enable the operator to know whether the distance to the object has been accurately estimated. When the operator knows that a given distance to the object corresponds to illuminating of a given indicating lamp, he can select a pulse oscillator corresponding to the required distance to carry out the main flash illumination during which film is exposed in the same manner as described above in connection with FIG. 9.

In FIG. 11 those components which correspond to those of FIG. 9 are indicated by the same reference characters.

Referring to FIG. 11 it will be seen that the outputs of the several oscillators $O_1$, $O_2$ . . . are connected to the AND circuits $a_{11}$, $a_{12}$ . . . respectively, while the inputs of these AND circuits are also supplied with the output of a light-responsive timer circuit 40, the arrangement being such that during preliminary flash illumination the gate opening time of the AND circuit $a_{11}$, $a_{12}$ . . . corresponds to the distance to the object.

The light-responsive timing circuit 40 includes a photosensitive means P and a resistor R connected in series, and a Schmitt circuit formed by transistors $T_1$ and $T_2$ is provided to determine the reversal time in accordance with the potential at the junction M of the series circuit formed by components P and R. A change-over switch 41 is provided with flash preliminary flahs terminal 41*a*, a main flash terminal 41*b*, and a non-operating or idle terminal 41*n*.

Figure 12:
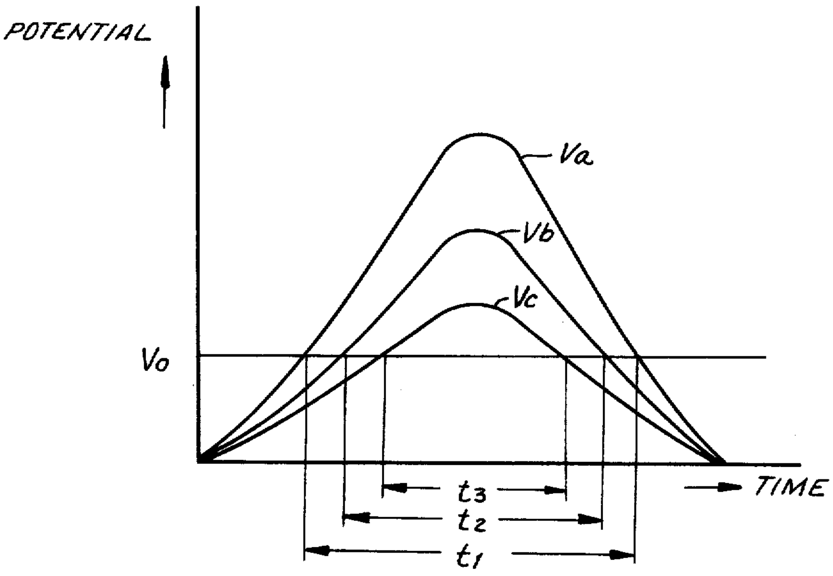
FIG. 12 is a graph illustrating the manner in which circuitry of FIG. 11 operates.

The operation of the timer circuit 40 will be understood in connection with the graph of FIG. 12 which shows characteristic curves of the timer. The potential at junction M between photosensitive means P and resistor R is at a maximum as illustrated by the curve V*a* of FIG. 12 when the object is at a relatively short distance during the preliminary flash operation. As the distance to the object increases, the potential at junction M decreases, as indicated by the curves V*b* and V*c*. Therefore, assuming that the switching level of the Schmitt circuit is established at V*o* in FIG. 12, then the Schmitt circuit will provide for reversal operations for the time intervals $t_1$, $t_2$ and $t_3$ with respect to the potentials of the curves V*a*, V*b* and V*b*, respectively.

Assuming that the distances from the flash apparatus to the object of 1 *m*, 2 *m*, and 3 *m* respectively correspond to the curves V*a*, V*b*, and V*c*, then in accordance with these distances for the times $t_1$, $t_2$ and $t_3$, respectively, the timer signal is supplied to the AND circuits $a_{11}$, $a_{12}$ . . . through the change-over switch 41.

The pulse signal of each oscillator is supplied to the trigger circuit 34*a* of the flash means 34 through the AND circuits $a'_{11}$, $a'_{12}$ . . . and the OR circuit 31'. The switch 32 schematically illustrated in FIG. 11 is provided for use during main flash illumination when film is exposed, while the switch 32' is provided for use in connection with the preliminary flash operation.

While during the main flash illumination when film is exposed the switch 35 is situated by adjustment of the diaphragm 45 through a transmission 46 or a suitable driving unit in engagement with a particular contact or terminal of the frequency divider 33, so that the terminal contacted by the switch 35 will correspond to the diaphragm setting, during preliminary flash operation the diaphragm 45 is set at a value which will situate the switch 35 in engagement with the terminal 35*a* so that preparatory flash illumination is always carried out with a constant frequency conversion. The rotary switch structure 37 of course forms the terminating means for terminating the operation of the counter 36 and transmits through the conductor shown at the right of FIG. 11 the signal to the flash control means 34*b* in order to terminate the flash during main flash illumination. However, for the purposes of preliminary flash illumination an additional terminal 37*n* is provided, this terminal being an idle terminal which is not electrically connected with any of the counter stages of the counting means 36, and during preliminary flash when the switch 37 engages the terminal 37*n*, it is clear that there will be no signal from the terminating means to the flash control means 34*b*.

The lamps $L_{11}$, . . . $L_{14}$, $L_{15}$, $L_{16}$ are connected to the output sides of the counting elements or stages of the preset counter 36, respectively, for indicating the distances between the object and the flash apparatus. The structure is arranged in such a way that illumination of different ones of these lamps will be indicative of certain distances. For example, illumination of lamp $L_{11}$ will indicate a distance of 1 *m*, while the next unillustrated lamp will indicate a distance of 2 *m*, and so on. It is of course to be understood that these indicating lamps may, if desired, be connected to the counter 36 through a decoder.

The embodiment of FIG. 11 operates as follows:

Prior to actual film exposure, the switch 35 is placed in contact with terminal 35*a* and the switch 37 is placed in contact with terminal 37*n*, while the change-over switch 41 of the light-responsive timer circuit 40 is placed in contact with the terminal 41*a*. In this way the structure has been set for the preliminary flash operation.

Now the operator will select a particular pulse oscillator in accordance with the distance to the object as estimated by eye. In this particular case it is not required to know in advance the accurate distance to the object. For example, if the operator estimates by eye that the distance to the object is 1 *m*, then the operator will close the switch $S_{11}$ so as to make in this way a selection of the oscillator $O_1$. Of course, preliminarily all of the oscillators are in an oscillation state. After closing the switch $S_{11}$, the switch 32' is closed, so that the pulse signal of the oscillator $O_1$ is applied to the trigger circuit 34*a* through the AND circuit $a'_{11}$ and the OR circuit 31'. Thus, almost simultaneously with closing of the switch 32' the flash discharge tube is energized to provide flash illumination. The result is that the photosensitive means P of the timer circuit 40 will receive light so that at the junction M there will appear a potential as indicated by the graph of FIG. 12. The distance to the object of 1 *m* produces a potential corresponding to the curve $V_a$, so that the gate of the AND circuit $a_{11}$ is opened for the time $t_1$. Therefore, during this time $t_1$ the pulse signal of the oscillator $O_1$ is supplied to the counting means 36 through the OR circuit 31, the frequency divider 33 and the rotary switch 35, which at this time engages terminal 35*a* as pointed out above. In this case the pulse oscillator $O_1$ has the highest oscillation frequency and the gate opening time duration of the AND circuit $a_{11}$ is relatively long, as indicated by the time $t_1$ of FIG. 12, so that the number of pulses counted by the counting means 36 will be relatively great and therefore the indicating lamp $L_{11}$ will become illuminated if in fact the distance has been properly estimated, so that when the operator sees that the lamp $L_{11}$ is illuminated he knows that the distance of 1 *m* to the object has been accurately estimated.

If, however, the actual distance to the object is 2 *m*, but the user has estimated that this distance is 1 *m*, so that the switch $S_{11}$ has been closed to select the pulse oscillator $O_1$, even though the operator should have closed the switch $S_{12}$ to provide a proper exposure, then under these conditions at the junction M of the light-responsive timer circuit 40 there will appear the lesser potential as illustrated by the curve $V_b$ of FIG. 12, so that the interval during which the gate of the AND circuit $a_{11}$ remains open under these conditions is the time $t_2$. As a result during this shorter interval $t_2$ the pulse signal of the oscillator $O_1$ will be supplied to the counting means 36. Under these conditions due to the shorter interval the counting means 36 will not count sufficient pulses to cause the lamp $L_{11}$ to become illuminated. Instead one of the indicating lamps to the left of the lamp $L_{11}$ as viewed in FIG. 11 will become illuminated. In this way the operator will know that the distance to the object is more than 1 *m*, and the above operations will be repeated with the operator selecting a different oscillator in order to confirm that the distance has been accurately estimated. Under these conditions the operator may well decide to close the switch $S_{12}$ so as to select the osciallator $O_2$, and the above operations will now be repeated. During the time $t_2$ the pulse signal of the oscillator $O_2$ is supplied to the counting means 36, and under these conditions the lamp next to the lamp $L_{11}$ will become illuminated so that the operator will know that indeed the accurate distance to the object is 2 *m*.

Thus, it is possible with the embodiment of FIG. 11 for the operator to confirm that the distance to the object has been accurately estimated. Estimating by eye relatively short distances such as 1 *m* or 2*m* will not result in any particulary great error, but on the other hand estimating relatively long distances such as 5 *m* or 7 *m*, will indeed result in substantial errors. It is under conditions involving these latter greater distances that the embodiment of FIG. 11 is particularly effective. After the accurate distance to the object has been determined, a pulse oscillator corresponding to this distance is selected, and during actual exposure when main flash illumination is provided the change-over switch 41 of the light-responsive timer circuit 40 is placed in engagement with the contact 41*b*, while the rotary switches 35 and 37 are placed in engagement with the proper contacts to be used in connection with actual film exposure. Then the trigger switch 32 will be closed in synchronism with opening of the shutter, so that the structure of FIG. 11 will now provide a flash discharge corresponding properly to the distance between the object and the flash means, in the manner described above in connection with the embodiment of FIG. 9.

As described above, during preliminary flash operation a pulse oscillation is selected according to the estimated distance to the object as measured by eye. It is to be noted that it is also possible to confirm that the distance has been accurately estimated by utilizing a single specific pulse oscillator. For example, if a specific pulse oscillator $O_1$ is selected, a pulse signal of constant frequency is supplied to the counting means 36 during the gate opening times of AND circuit $a_{11}$, namely time interval $t_1$, $t_2$, $t_3$ . . . corresponding to the particular distance to the object, so that the position of a particular indicating lamp which becomes illuminated will be determined corresponding to the actual time interval $t_1$, $t_2$, $t_3$ . . . Therefore, the user can determine the distance to the object according to the particular indicating lamp which becomes illuminated. In other words instead of making an estimate the user will simply always close the switch $S_{11}$ so as to utilize the oscillator $O_1$ to determine the distance, and under these conditions the operatcr will note which of the lamps becomes illuminated so that by noting the particular lamp which becomes illuminated the operator will then know the distance to the object and can therefore select the proper oscillator during actual film exposure. Of course, instead of using the oscillator $O_1$ or one of the other oscillators for this purpose, a special oscillator in addition to the several oscillators $O_1$, $O_2$, etc. may be provided simply for the purpose of determining the distance to the object during the preliminary flash operation.

Figure 13:
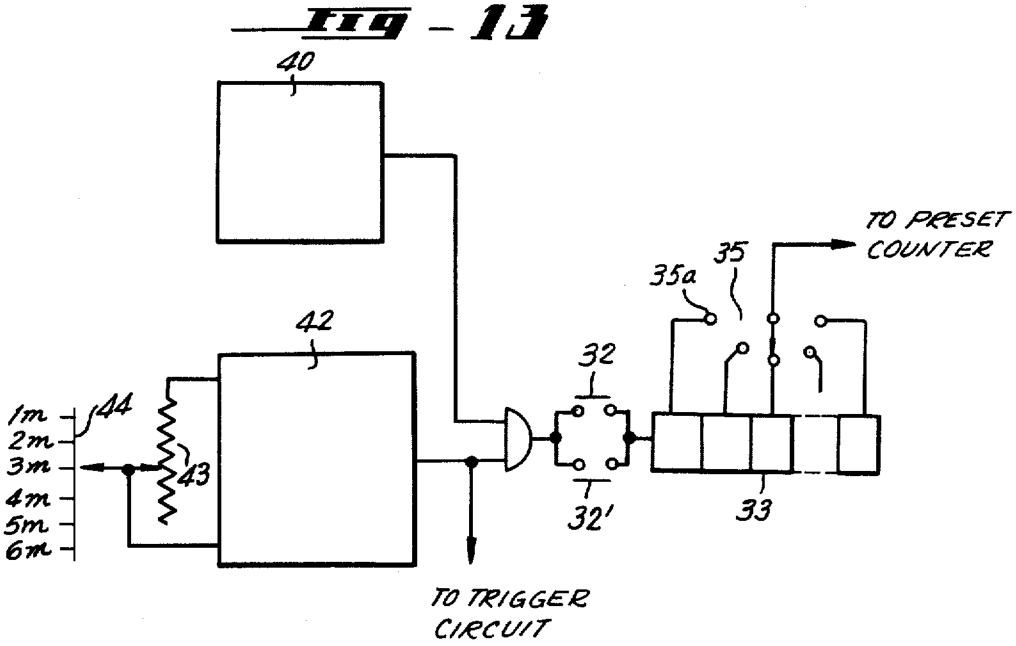
FIG. 13 is a fragmentary schematic illustration of a variation of the embodiment of FIG. 11 according to which a single oscillator is capable of being used instead of a plurality of oscillator units.

The embodiment of FIG. 13 is the same as that of FIG. 11 except that instead of a plurality of separate oscillator units $O_1$, $O_2$, . . . there is only a single oscillator unit 42 provided with a variable resistor 43 which can be adjusted according to the scale 44 to provide the selected frequency.

It is to be noted that while in FIGS. 9 and 11 there is shown in phantom lines a driving connection between the diaphragm and the switch 35 for automatically setting the latter according to the diaphragm setting, it is also possible for the operator simply to set the switch 35 manually according to the diaphragm setting without requiring any interconnection as shown in phantom lines in FIGS. 9 and 11.

In the above examples such as those of FIGS. 9 and 11, a pulse frequency is selected according to the distance to the object. As a result it becomes possible to maintain the diaphragm setting constant even though the distance to the object may vary, so that the photographing operations can be carried out with a preselected diaphragm setting which may be selected to take into consideration a desired depth of field.

Moreover, inasmuch as the extent of flash discharge corresponding to the distance to the object is experimentally determined in order to provide a proper exposure, with a knowledge of the distance to the object selection of a proper pulse signal frequency can be carried out in an extremely simple manner so as to provide a highly convenient operation.

As may be seen from FIG. 11, prior to the main flash illumination when film is actually exposed, the distance to the object can be confirmed during a preliminary flash illumination, so that an accurate pulse signal frequency can be selected. Therefore, even in the event that there is a relatively long distance to the object, or under any conditions where the user cannot accurately determine the distance to the object, as for example due to relatively dark illuminating conditions, nevertheless it is possible with the embodiment of FIG. 11 for the operator to carry out an accurate exposure without possibility of error.

Figure 14:
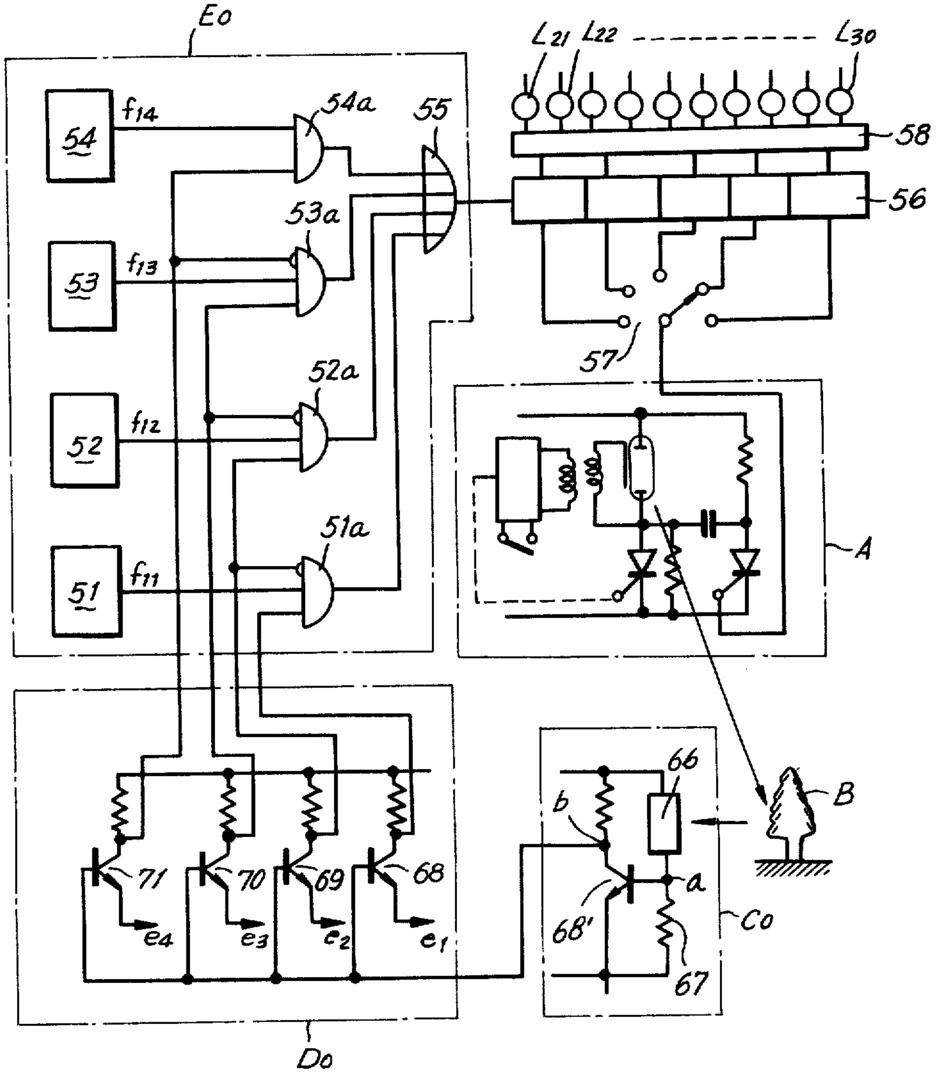
FIG. 14 is a schematic illustration of an embodiment of the invention according to which it is possible for the circuitry itself automatically to select oscillator units which will provide pulses at proper frequencies.
Figure 15:
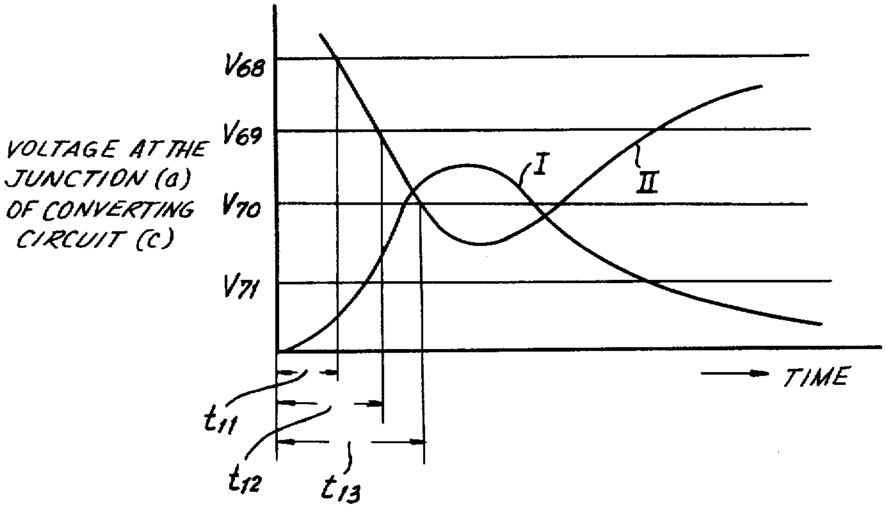
FIGS. 15 and 16 are graphs illustrating the operation of the circuitry of FIG. 14.
Figure 16:
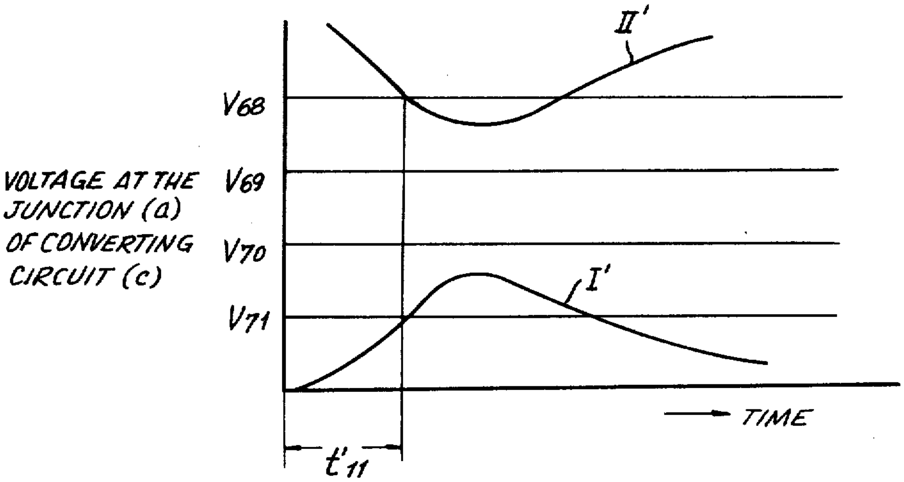
Figure 17:
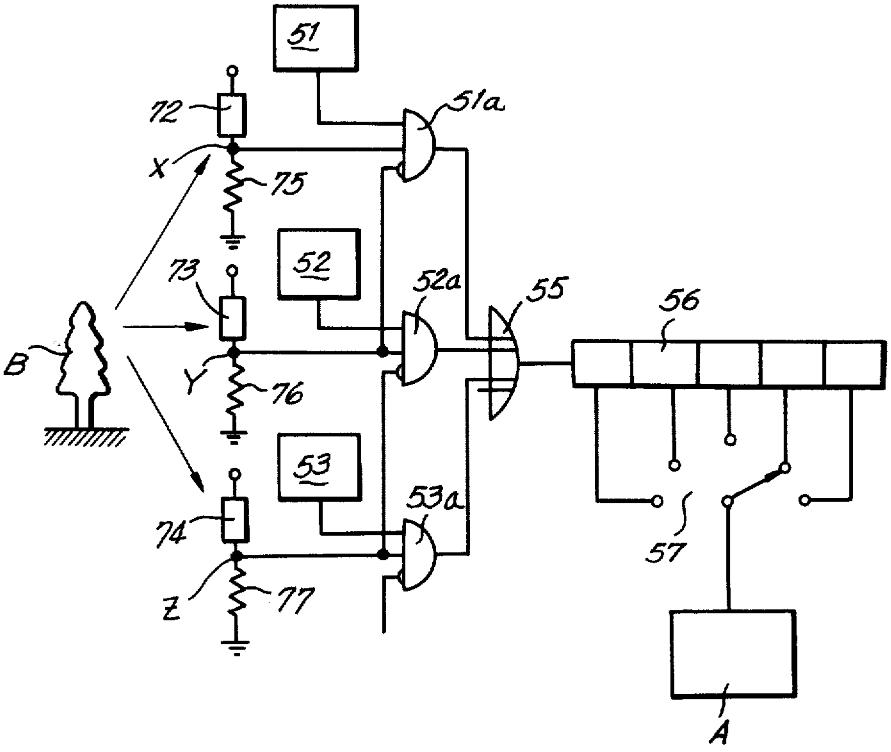
FIG. 17 is a schematic representation of an embodiment which also is capable of automatically determining the pulse frequency, with the embodiments of FIGS. 14 and 17 automatically progressing from one oscillator to another according to the requirements.
Figure 18:
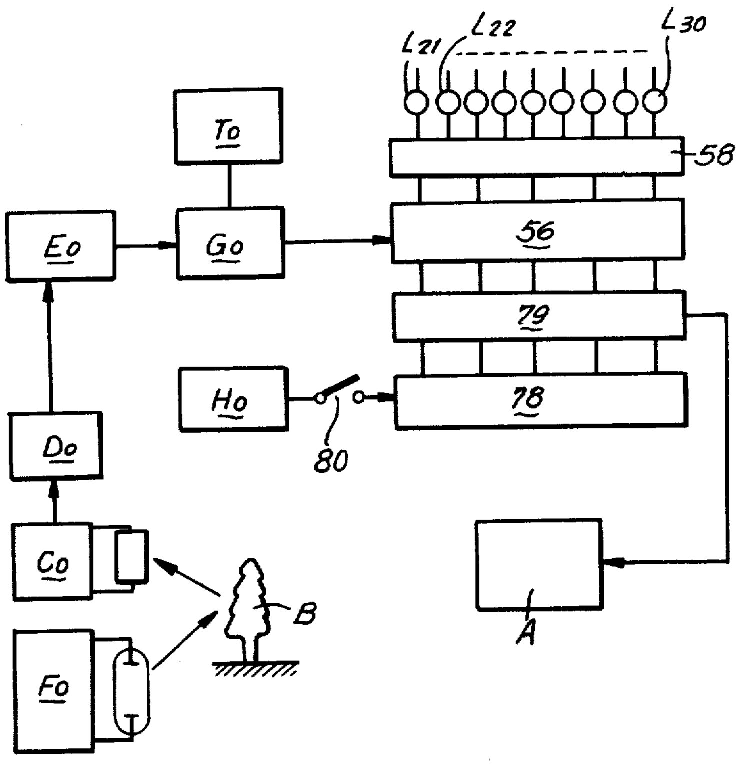
FIG. 18 is a schematic representation of an embodiment similar to FIG. 14 but utilizing a preliminary flash for determining a number of pulses which are compared with reference pulses during main flash illumination.

Referring now to FIGS. 14–18, the embodiments of the invention illustrated therein also provide a pulse frequency according to the distance of the object from the flash means, or in other words according to the distance of the object from the camera, which amounts to the same thing, but whereas with the embodiment of FIG. 9 or the embodiment of FIG. 11 selection is made of a particular pulse frequency with the embodiments illustrated in FIGS. 14–18, or more particularly FIGS. 14, 17, and 18, the several oscillators which provide different pulse frequencies are automatically set into operation progressing from one pulse oscillator to the next, as required in order to obtain automatically a pulse frequency which will provide a proper exposure. In other words, in order to achieve a particular extent of flash illumination an automatic selection is made in a stepwise manner among several oscillators.

Referring to FIG. 14, the part thereof contained within the dot-dash line area Eo includes the oscillator means which has the pulse oscillators 51, 52, 53 and 54 which respectively have frequencies $f_{11}, f_{12}, f_{13}$ and $f_{14}$ which vary from one to the next in a stepwise manner according to which $f_{11}<f_{12}<f_{13}<f_{14}$. Oscillation pulse gate circuits are connected into these oscillators and include the inhibit gate circuits 51*a*, 52*a*, 53*a*, as well as the AND circuit 54*a*. The gates of these circuits are opened by way of a selecting circuit described below.

The pulses produced by the oscillators are supplied to a counting means 56 through an OR circuit 55. The counting means 56 counts the pulses up to a given number of pulses as determined by the setting of the rotary switch 57, the rotary switch member of which forms the means for terminating the operation of the counter and for transmitting to the flash means A a signal so that the flash control means will bring about termination of the flash illumination in the manner already described above. This embodiment also has lamps $L_{21}$–$L_{30}$ which are connected to the counting means 56 through a decoder 58. Of course the position of the particular lamp which will be illuminated is determined in accordance with the number of pulses counted. Thus the counting means is set to count up to a given number of pulses, and in this way a signal will be generated to be transmitted to the flash control means which terminates the flash illumination, this signal being transmitted through the rotary switch 57. The flash means A is of a well known construction corresponding to that shown in in FIG. 1, for example.

The structure included within the dot-dash line area Co forms a converting circuit means which converts the light reflected from the object B during flash illumination into corresponding electrical signals. This converting circuit means has, as shown in FIG. 11, at the lower right part thereof, a photosensitive light-receiving element 66 such as a photosensitive transistor. The latter element is connected in series with a resistor 67. To the junction *a* between the components 66 and 67 is connected the base of an amplifying transistor 68'. Referring to FIG. 15, there appears during operation at the junction *a* a voltage as indicated by the curve I. At the output end *b* of a circuit Co there will therefore appear an output voltage as illustrated by the curve II of FIG. 15.

Within the dot-dash line area Do of FIG. 14 there is illustrated a selecting circuit means which receives the output voltage of the converting circuit means Co. This selecting circuit means is made up of switching transistors 68, 69, 70 and 71 which respectively have switching levels varying from one to the next in a stepwise manner. The several bases of the transistors 68–71 are connected in common to the output end *b* of the converting circuit Co. The emitter voltages of transistors 68–71 are $e_1$, $e_2$, $e_3$ and $e_4$, respectively, which satisfy a relation according to which $e_1>e_2>e_3>e_4$, so that the switching levels of the transistors 68–71 are established as $V_{68}$, $V_{69}$, $V_{70}$ and $V_{71}$ of FIG. 15, respectively. Of course, the several emitters of the transistors 68–71 can be connected in common to a bus or the like which is connected to a source such as a suitable battery, and it will be understood that all of the circuits shown in the drawings and referred to above will be completed in a well known manner so as to have a suitable source of energy, the drawings and description showing only portions of the circuit sufficient to provide a full understanding of the invention.

The embodiment of FIG. 14 operates in the following manner:

First, an unillustrated main switch, closed during the initial part of the movement of a shutter-tripping plunger, for example, will close the circuits to connect them to a suitable current source, and in this way all of the oscillators 51–54 are set into operation. When the shutter-tripping plunger has been depressed sufficiently to actually trip the shutter, then simultaneously with the opening of the shutter a well known synchronizing switch is closed and the discharge flash tube of the flash means a is energized to provide flash illumination in a well known manner. Now the objectB will reflect light, which includes the flash illumination, to the photosensitive means 66 of the converting circuit Co, so that the intensity of the reflected light as received by photosensitive means 66 will vary according to the distance to the object B. Assuming that the object B is only at a relatively short distance from the camera or flash means, then there will appear at the junction a of the converting circuit Co a conversion voltage as indicated by the curve I of FIG. 15, so that at the output end b of the circuit Co there will appear an output voltage as indicated by the curve II of FIG. 15. This output voltage will have a high value if there is no discharge flash, so that those transistors of the selecting circuit Do whose bases receive this output voltage are ON. As the discharge flash operation continues, the voltage at the output end *b* drops. At the time $t_{11}$ of FIG. 15, the transistor 68 of the selecting circuit Do is turned OFF.

When the transistor 68 is thus turned OFF, its collector voltage rises rapidly. This voltage is supplied to the inhibit gate circuit 51*a* so that only this inhibit gate circuit 51*a* is opened at this time. The inhibit gate circuit 51*a* has three inputs, namely the input formed by the collector voltage of the transistor 68, the input formed by the oscillation pulses of the oscillator 51, and a third input formed by the inverted state of the collector voltage of transistor 69 which at this time is zero. Therefore, at this particular time corresponding to the time $t_{11}$ of FIG. 15, the inhibit gate circuit 51*a* is opened and accordingly the oscillation pulses of oscillator 51 at the frequency $f_{11}$ are supplied to the counting means 56.

At this time the first inputs of the inhibit gate circuits *52a* and *53a* and the AND circuit *54a* receive the collector voltages of the transistors 69, 70 and 71, respectively, with the latter voltages being zero at this time, and these particular circuits are at this particular time in a closed state so that transmission of the oscillation pulses of the oscillators 52, 53, and 54 is prevented.

However, when the time has progressed up to the time $t_{12}$ indicated in FIG. 15, the transistor 69 of the selecting circuit Do is turned OFF, so that now the inhibit gate circuit 52a is opened. At the same time, the inverted state of the collector voltage of transistor 69 is applied as an input to the inhibit gate circuit *51a*, so that the latter circuit is closed. Therefore, when the time $t_{12}$ of FIG. 15 is reached only oscillation pulses from the oscillator 52, having a frequency $f_{12}$ are supplied to the counting means 56.

Upon reaching the time $t_{13}$ of FIG. 15, transistor 70 of the selecting circuit Do is turned OFF, so that inhibit gate circuit *53a* is opened and at the same time inhibit gate circuit *52a* is closed. Accordingly, upon reaching the time $t_{13}$ the oscillation pulses of oscillator 53 at a frequency $f_{13}$ are supplied to the counting means 56.

Therefore, it will be seen that the counting means 56 counts pulses successively at the frequencies $f_{11}$, $f_{12}$ and $f_{13}$. During counting of the pulses of the frequency $f_{13}$, the predetermined number of pulses is counted so that a counting signal is generated through the rotary switch 57 which forms the terminating means for terminating the operation of the counting means. As set forth above, this signal will cause operation of the flash-control means which terminates the discharge of the flash illumination of the flash means A in the manner described above.

Therefore, it will be seen that the flash illumination is terminated when the counting means 56 receives pulses from the oscillator 53. The structure is experimentally arranged in such a way that the amount of flash discharge generated up to this time is the proper amount to achieve a proper film exposure for the particular object which is to be photographed.

In the event that the object B is at a relatively great distance from the camera or flash means, the light reflected by the object which includes the flash illumination is weaker than in the example described above, so that at the junction *a* of the converting circuit Co, there will appear a voltage as indicated by the curve I' of FIG. 16. In this case the output voltage of the converting circuit Co is as illustrated by the curve II' of FIG. 16, and only the transistor 68 of the selecting circuit Do will be turned OFF. Therefore, in this case the oscillation pulses of oscillator 51 at the frequency $f_{11}$ are supplied to the counting means 56 which will produce only with the latter pulses a counting signal when the predetermined number of pulses have been counted. In this case, therefore, counting up to the predetermined number of pulses is made only with the pulses at the relatively low frequency $f_{11}$, so that the time required for counting up to the predetermined number of pulses is relatively long so that the duration of flash illumination is also relatively long.

Thus, in accordance with the distance to the object B, the structure of FIG. 14 will operate automatically to provide in a stepwise manner pulses of frequencies $f_{11}$, $f_{12}$ and $f_{13}$, so that if the object b is at a given distance from the camera or flash means which is shorter than the distance as set forth above where only the oscillator means 51 will provide the pulses, then there will automatically come into play in a stepwise manner the successive oscillators 52 and 53 which will provide the pulses at the higher frequencies resulting in the reduced duration of flash illumination which is required for the particular distance of the object B. As was set forth above, the relationship between the frequencies is such that $f_{11} < f_{12} < f_{13}$.

In the event that the distance to the object is so great that the flash illumination does not even reach the object, then the output voltage of the converting circuit Co cannot turn any of the transistors of the selecting circuit $D_0$ OFF, so that no pulses will be supplied under these conditions to the counting means 56. Accordingly, none of the lamps $L_{21}$–$L_{30}$ will become illuminated, so that the operator will know by noting the failure of any of the lamps to become illuminated that it is impossible to proceed to provide a proper flash exposure. In this event the operator will situate the camera together with the flash means at a shorter distance from the object, and at this shorter distance an attempt will be made to achieve a proper exposure.

FIG. 17 shows an embodiment of the invention which while operating on the same principles as that of FIG. 14 nevertheless does not require the converting circuit Co and the selecting circuit Do. In FIG. 17 the components which correspond to those of FIG. 14 are designated by the same reference characters. According to FIG. 17, there are plurality of light-receiving photosensitive means 72, 73, 74 respectively situated at equal distances with respect to the object B. The several photosensitive means 72–74 are respectively connected in series with resistors 75–77, as illustrated. These resistors have resistance values which vary in a stepwise manner and the voltages appearing at the junctions X, Y, and Z will provide a selection of the oscillators 51, 52 and 53. For this purpose the resistance values $R_1$, $R_2$ and $R_3$ of resistors 75, 76 and 77, respectively, satisfy a relationship according to which $R_1 > R_2 > R_3$.

With the embodiment of FIG. 17, the light reflected from the object during flash illumination is simulataneously received by the several light-receiving photosensitive means 72–74, and under these conditions there will initially be a voltage $V_x$ at the junction X so that the inhibit gate circuit *51a* is opened and oscillation pulses from the oscillator 51 are supplied to the counter means 56. Shortly thereafter the voltage of the junction Y will reach the value $V_Y$ so that the inhibit gate circuit *52a* will become opened, and at the same time the inhibit gate circuit *51a* is closed, so that now the oscillation pulses of the oscillator 52 are supplied to the counter means 56. When the light reflected by the object is sufficiently intense to enable the voltage of the junction Z to reach the value $V_Z$, then the inhibit gate circuit *53a* will open while at the same time the inhibit gate circuit *52a* will become closed, and therefore oscillation pulses of the oscillator 53 will now be supplied to the counting means 56. It is to be noted that at the several junctions X, Y and Z, the voltages $V_X$, $V_Y$ and $V_Z$ are all equal to each other, these voltages representing the voltage level values which are sufficient for opening the several inhibit gate circuits *51a*, *52a*, and *53a*, respectively.

With the embodiment of FIG. 17 the operation also is one according to which, for example, if the object B is at a relatively great distance, only the oscillator 51 will transmit its pulses to the counting means 56 while at shorter distances the oscillators 52 and 53 will successively come into operation as set forth above, so that the time required for the counting means 56 to count up to the predetermined number of pulses will be an accurate indication of the flash illumination required to achieve a proper exposure. Thus, in the same way as described above in connection with FIG. 14, automatic control of the flash illumination can be carried out in accordance with the distance to the object.

The embodiment of the invention which is illustrated in FIG. 18 is the same as that of FIG. 14 except for the differences pointed out below. The particular embodiment shown in FIG. 18 is suitable for use with a camera which measures light after the light has travelled through the objective of the camera. Thus the embodiment of FIG. 18 may be used with single-lens reflex cameras where prior to exposure light travels through the objective to be reflected to the viewfinder where light measurement is carried out as is well known. Of course, operations of this latter type are made without flash illumination. However the embodiment of FIG. 18 is particularly suited for a camera of this type where a preliminary flash illumination will provide at least part of the light reflected from the object to be photographed with the latter reflected light being received in and passing through the camera objective to enable the distance to the object to be detected so that a proper main flash illumination can be provided during film exposure. Thus, this embodiment has a flash control means attached to the discharge flash apparatus for a single-lens reflex camera and includes a flash means A for providing main flash illumination during film exposure as well as a preliminary flash means Fo which provides preliminary flash illumination. Prior to opening of the shutter, the preliminary flash means Fo is operated to provide the preliminary flash illumination, and the resulting light which is reflected from the object is detected in the photographing light path with the extent of illumination provided by the flash means A during film exposure being determined in accordance with the detecting signal memorized during preliminary flash illumination. In FIG. 18 those components which correspond to those of FIG. 14 are designated by the same reference characters. The converting circuit Co shown in FIG. 18 is situated, for example, within the viewfinder of the camera so as to receive the light reflected during preliminary flash illumination after this light has travelled through the camera objective. The oscillation pulses from the oscillator means Eo are supplied to an addition counting means 56 through a gate circuit Go which is opened in accordance with the time established by a timer circuit To. In the embodiment of FIG. 18, the counting means 56 serves also as a memory means for memorizing the extent of flash illumination required for proper film exposure. With the embodiment of FIG. 18, however, it is the counting means itself which is connected to the flash-control means for bringing about the termination of the main flash illumination provided by the flash means A. In this embodiment the flash control means includes a subtraction counter 78 which receives pulses at a constant frequency from a reference pulse oscillator Ho, the latter being connected to the subtraction counter 78 of the flash control means by way of a switch 80 which is closed in synchronism with the opening of the shutter and the start of the main flash illumination provided by the flash means A. Between the subtraction counter 78 and the addition counter 56 is located a comparing or coincidence circuit means 79 which compares the values counted by the counter 78 with the previously counted value memorized by the counting means 56, the means 79 providing a coincidence signal when the number of pulses counted by means 78 from the reference pulse oscillator Ho has a predetermined relationship with respect to the number of pulses previously counted by the counter means 56. Thus, when, for example, the reference pulses counted by the means 78 equals the number of pulses counted by the means 56, the means 79 will automatically respond to provide for the flash means A a signal which will terminate the main flash illumination. The structure of the comparing circuit means 79, the subtraction counting means 78 and the addition counting means 56 are all well known.

Thus, with the embodiment of FIG. 18, the intensity of the light reflected from the object is detected by way of the preliminary flash illumination prior to opening of the shutter and actual exposure of the film to the flash illumination provided by the main flash means A. The output voltage of the converting circuit Co is determined in accordance with the light reflected from the object during preliminary flash operation, in the same way as described above in connection with FIG. 14, and this output voltage will automatically make a selection of the oscillators in the oscillator circuit section Eo through the operation of the selecting circuit means Do described above in connection with FIG. 14. The oscillation pulses from the oscillator circuit section Eo are supplied to the counting means 56 during the gate opening time as determined by the timer circuit To. The counting means 56 counts the supplied pulses and memorizes the result. The number of pulses memorized by the counting means 56 will increase as the distance to the object becomes shorter while the number of memorized pulses at the counting means 56 will decrease as the distance to the object becomes greater. In other words the number of pulses counted and memorized by the counting means 56 in the embodiment of FIG. 18 will vary inversely with the distance to the object.

When the latter number of pulses has been counted and memorized by the counting means 56, the shutter is tripped. For example the operation during preliminary flash is carried out during the initial part of the shutter-tripping plunger, and these operations are completed by the time the plunger has been depressed to an extent sufficient to trip the shutter and start the operation of flash means A in synchronism with opening of the shutter. At the same time that the shutter opens and the main flash illumination is provided by the flash means A, the switch 80 is closed also in synchronism with opening of the shutter, so that reference pulses of a constant frequency are supplied to the subtraction counter 78. When the value counted by the counter 78 becomes equal to the memorized value of the counter 56, the coincidence circuit 79 will automatically respond by providing a coincidence signal which is transmitted to the flash means A in order to terminate the main flash illumination. It is to be noted that since the counter 78 is a subtraction counter a relatively large number of pulses will be subtracted before the value at the counter 78 equals the value at the counter 56 in the event that the latter has counted a relatively short number of pulses, so that for relatively long distances a relatively long duration of main flash illumination will be provided. On the other hand, if the counter 56 has memorized a relatively large number of pulses in accordance with a relatively short distance to the object, then the subtraction counter 78 will only subtract a relatively short number of the reference pulses in order to provide a value equal that of the counter 56 so that when the object is at a relatively short distance the main flash illumination will have a relatively short duration. Of course, the same results can be achieved by making counter 56 a subtraction counter and counter 78 an addition counter. Thus, the controls necessary for flash illumination can always be provided accurately.

With the embodiments of FIGs. 14, 17 and 18 it is a simple matter to incorporate into the structure settings to take into account such parameters as the diaphragm aperture, the film speed, and the like. For this purpose, example, the rotary switch 57 of FIG. 14 which forms part of the flash control means for terminating the flash illumination of the flash means A can be set into egagement with a given terminal. Also, a frequency divider circuit may be incorporated between the oscillator circuit section Eo and the counter means 56 for the purpose of introducing one of the above parameters. Thus, such a frequency divider circuit can be adjusted to take into account the setting of the diaphragm or the film speed.

While in the embodiment of FIG. 14 the flash control means which terminates the operation of the flash means A is of the series type, it is also possible to use a parallel type of flash control means in which the discharge flash tube and the switching element such as the SCR element are connected in parallel. In addition, as a means for terminating the flash illumination it is possible to utilize a material which has light-interrupting properties due to the variation of an applied voltage such as a Kerr cell, and a device of this latter type may be situated in front of the flash discharge tube.

Moreover, while in FIG. 14 four pulse oscillators are illustrated and in FIG. 17 three pulse oscillators are shown, it is to be understood that the number of pulse oscillators may be determined as required for a particular apparatus.

FIGS. 19–24 illustrate embodiments of the invention which in many respects are similar to the embodiment of FIG. 18 in that the flash control means of these embodiments also includes a counter for counting reference pulses with a comparing or coincidence circuit means being provided to bring about termination of the flash illumination, although with the embodiment of FIGS. 19–24 the pulses are derived from an oscillating means C which is similar to that of FIG. 1 in that it provides automatically pulses at a frequency proportional to the intensity of the light reflected from the object, as was the case with FIG. 1.

Figure 19:
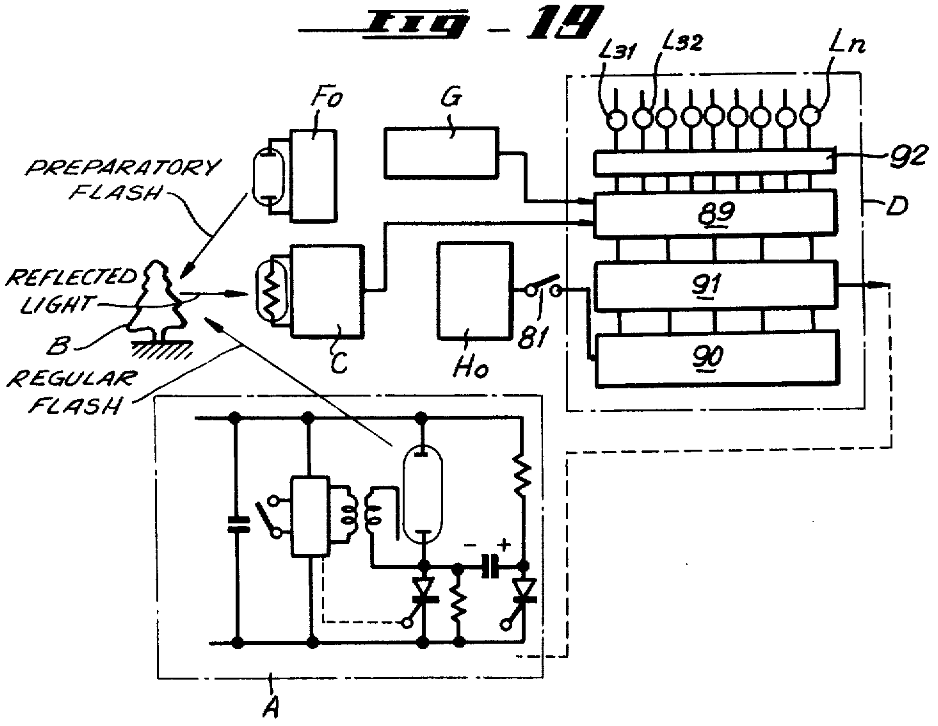
FIG. 19 is a schematic representation of an embodiment similr to that of FIG. 1 but also utilizing first a preliminary flash to determine a number of pulses which are compared with reference pulses during main flash illumination.

In the embodiment of FIG. 19 there is illustrated a flash means A which may be identical with that of FIG. 1 and which provides the main or regular flash illumination to be utilized during film exposure. FIG. 19 also schematically illustrates an object B as well as the light-responsive oscillator means C. In addition there is a reference pulse oscillator Ho which provides reference pulses at a constant frequency upon opening of the shutter. In addition within the dot-dash line area D are the counting means 89, and the flash-control means connected thereto and including the counting means 90 as well as the comparing or coincidence circuit means 91. Thus, from the latter is derived a signal which terminates the main flash illumination provided by the flash means A. In addition the structure includes a memory signal stopping circuit G which terminates operation of the counting means 89 when a given number of pulses have been counted. Also there is a preliminary flash means Fo providing a preliminary or preparatory flash from which the counting means 89 will provide the value to be compared with the number of reference pulses counted by the counting means 90 upon closing of the switch 81 in synchronism with opening of the shutter.

The light-responsive oscillator means C of FIG. 19 is an oscillator for determining the repetition period or frequency of the oscillation pulses in accordance with a photoelectric conversion signal of a photosensitive lightreceiving element situated within the photographing light path, for example within the viewfinder of a single-lens reflex camera, so that the embodiment of FIG. 19 is of the type where the light travels first through the objective before reaching the oscillator means C. The arrangement is such that the interval from one pulse to the next of the oscillator means C is inversely proportional to the reflected light intensity, or in other words the frequency of the pulses provided by the oscillator means C is directly proportional to the reflected light intensity. Therefore, when the reflected light is relatively intense a high frequency for the pulses will be provided with a short interval from one pulse to the next, while at relatively weak reflected light intensities the period from one pulse to the next is relatively long and the frequency of the pulses is of a lesser magnitude.

The oscillator means C of FIG. 19 may have any of the constructions provided above in connection with FIGS. 2–6. It is desirable to utilize a high-sensitivity photosensitive means such as a photodiode as the light-sensitive element of the oscillator means which receives the reflected light and which is situated within the path of the photographing light, namely at the viewfinder to receive light which has travelled through the objective.

In addition to the oscillator C there is the reference pulse oscillator Ho which provides the reference pulses at a constant frequency, and it is of course these pulses which are counted by the counting means 90 to be compared with the previously counted pulses memorized by the counting means 89. As was pointed out above, the switch 81 is closed by synchronism with opening of the shutter so that reference pulses are transmitted to the counting means 90 simultaneously with opening of the shutter.

In the example of FIG. 19 the counting means 89 is an addition counter serving as a first digital memory device while the counting means 90 is a subtraction counter serving as a second digital memory device, and the comparing or coincidence circuit means 91 will provide an output when the values memorized by the counters 89 and 90 have a given relationship with respect to each other such as a relationship where these values are equal. The counting means 89 will of course receive pulses from the light-responsive oscillating means C during a predetermined time, while the counting means 90 will receive pulses from the reference pulse oscillator means Ho. The output of the comparator circuit means 91 is supplied as a flash-stopping signal to a switching device in the circuit of the flash means A, so that this structure provides the flash-control means which operates according to the number of pulses counted by the counting means 89. In addition, the structure includes the indicating lamps $L_{31}$, $L_{32}$, . . . . $L_n$ which are connected to the various stages or elements of the counting means 89 through a suitable decoder 92 so that the operator will know the value of the number of pulses counted by the counting means 89. In this way the operator will know the intensity of the reflected light provided during the preliminary flash operation.

The memory signal stopping circuit G is in the form of a timing circuit the operating time of which can be arbitrarily established so as to determine the pulse-input time of the counting means 89.

The preparatory or preliminary flash means Fo is arranged in such a way that it will be actuated before actual opening of the shutter and is of a well known construction. For example the discharge flash tube of the flash means Fo is connected in series with a capacitor and the trigger circuit for starting the flash operation is arranged in such a way as to energize the flash tube of the preliminary flash means Fo during the initial part of the movement of the shutter-tripping plunger before the latter has been depressed to an extent sufficient for opening the shutter.

Thus, with the embodiment of FIG. 19 the preliminary flash operations are carried out prior to tripping of the shutter so that the light reflected by the object will travel along the photographing light path through the camera objective. This reflected light is sensed by the light-sensitive element situated, for example, within the viewfinder, and the light-responsive oscillator means C will produce pulses at a frequency which is directly proportional to the reflected light intensity. These pulses are transmitted to the counting means 89 where only those pulses which have been applied as an input during the time interval determined by the memory signal stopping circuit G are counted and memorized. The memory signal stopping circuit G is set into operation simultaneously with, prior to, or even slightly after the initiation of preliminary flash illumination provided by way of the preparatory flash means Fo. The pulses applied as an input to the counting means 89 are continued until the action of the memory signal stopping circuit G is completed. For example, if a binary addition counter of 5-stage counting elements is utilized for the counting means 89, then eight pulse inputs will produce an output 00010 and twenty pulse inputs will produce an output 00101, and this particular output state is memorized assuming that the above pulses have been transmitted to the counting means 89 during the interval determined by the means G, which is the counter terminating means.

Thereafter, in synchronism with the tripping of the shutter to start the exposure, the trigger switch of the flash means A and the switch 81 are closed so that the main or regular flash illumination is provided to expose film while at the same time the counting means 90 will count the reference pulses provided from the reference pulse generating means Ho. As was indicated above, these pulses from the means Ho have a constant frequency.

The counting means 90 is a subtraction counter so that if a binary subtraction of a 5-stage counting element is utilized, twenty-two pulse inputs will provide an output 00010 and eleven pulse inputs will provide an output 00101. Accordingly, when the counter 89 memorizes eight pulses and twenty pulses in the above examples, coincidence of output will be detected by the circuit 91 when the counting means 90 receives twenty-two and eleven pulses from the reference pulse means Ho. Thus, as was pointed out above, when at a relatively intense relected light high frequency pulses are provided by the oscillator means C so that the counting means 89 counts within the time interval determined by the means G, a relatively large number of pulses such as twenty pulses in the above example, then the counting means 90 will provide a relatively small number of pulses such as eleven pulses in this example, so as to provide a relatively short duration of flash illumination during film exposure. On the other hand, if a relatively weak reflected light intensity is provided, then a lesser number of pulses such as eight pulses will be counted by the means 89, and now a larger number of reference pulses such as twenty-two pulses in the above example will be counted by the subtraction counter means 90 before the coincidence or comparing circuit means 91 responds to terminate the flash illumination, so that in this case a longer interval of flash illumination is provided to take care of a situation where the reflected light intensity is relatively weak.

It will thus be seen that the number of input pulses of the counting means 90 of the flash control means decreases as the number of pulses counted by the counting means 89 increases. This latter amount of course increases directly in proportion to object brightness resulting from the preparatory flash illumination, so that the counting time of the counter 90, up to the start of coincident output which terminates the flash illumination becomes shorter as the amount of pulses counted by the counter means 89 becomes greater, so that for relatively intense reflected light the flash-terminating signal will be produced at an earlier instant.

Thus, with this embodiment the main flash terminating operation is provided by counting reference pulses of constant frequency at the counter 90 until reaching the memory amount of the counter 89, so that the main flash illumination necessary for proper exposure can be achieved by adjusting the operating time interval of the memory signal stopping circuit G.

Particularly with this embodiment, the memory amount is determined in proportion to the object brightness during preliminary flash, in other words the light reflected from the object and including in part the ambient light and in part the light from the preliminary flash. Thus, the flash stopping signal can be produced at a time which is inversely proportional to the memorized value so that whatever the ambient brightness the main flash illumination can be accurately controlled. By way of the lamps $L_{31} \ldots L_n$ it is possible to indicate to the operator the condition of the counter 89 so that the reflected light intensity at the time of the preliminary flash can be known by the operator. If it should happen that the reflected light during preliminary flash is so weak that the first or front stage indicating lamps such as the lamps $L_{31}$ and $L_{32}$ do not become illuminated in response to the preliminary flash illumination, the operator knows that the flash will be insufficient to reach the object to be photographed and thus will know enough to approach more closely to the object to be photographed. When it is desired to carry out a snychronizing photographing operation at relatively low illumination with measurement of the object distance by eye, such a distance cannot be accurately determined with the result that underexposures will be provided. However, the indicating lamps $L_{31}, L_{32} \ldots L_n$ are very effective for avoiding such an undesirable result.

Figure 20:
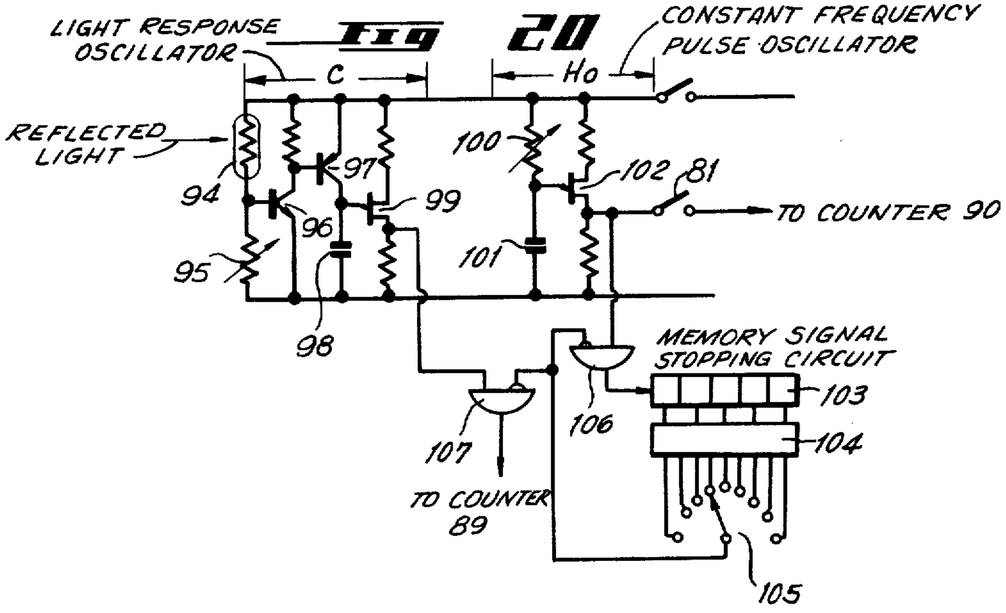
FIG. 20 is a wiring diagram schematically showing in greater detail features of FIG. 19.

FIG. 20 illustrates details of a light-responsive oscillating means C, a constant-frequency reference pulse oscillator Ho, and a memory signal stopping circuit G.

In the light-response oscillator C the arrangement is such that a divided voltage derived from the photo-sensitive means 94 and the variable resistor 95 will provide variations of the output impedances of transistors 96 and 97, while a capacitor 98 and the output impedance of transistor 97 constitute a timing cirucit. Accordingly, the charge condition of the capacitor 98 is determined in accordance with the internal resistance value of the light-sensitive element 94, and UJT 99 will provide osicllation pulses at a frequency which is directly proportional to the reflected light intensity. Inasmuch as the reflected light intensity will vary according to well-known discharge flash characteristics, the oscillation frequency of UJT 99 will also vary in a corresponding manner. Thus, for example, in the range in which the reflected light intensity becomes gradually higher the oscillation period from one pulse to the next will become gradually shorter, while the frequency will of course increase, and in a range wherein the reflected light intensity becomes gradually less, the oscillation period from one pulse to the next will become longer or in other words the frequency will become of a lesser value.

This photosentitive means 94 of the oscillator means C is situated within the photographing light path, for example, in the viewfinder of the camera. The constant-frequency reference pulse oscillator Ho is a well-known type of UJT oscillator wherein the UJT 102 will provide pulses at intervals determined in accordance with the time constant of the variable resistor 100 and capacitor 101. The memory signal stopping circuit G is formed by a binary counter 103 which receives osiclla-tion pulses from the constant-frequency reference pulse oscillator Ho. It will be noted from FIG. 20 that the reference pulse oscillator Ho is set into operation before the switch 81 is closed. A decoder 104 is connected to the binary counter 103 and an adjusting switch 105 is connected through the decoder 104 to the binary counter 103 so as to determine the time interval during which the counting means 89 will operate. As is apparent from FIG. 20, any output stage of counter 103 can be selected by change-over switch 105 to determine the time interval during which counter 89 will operate. It will be noted that the constant-frequency pulses from the reference pulse oscillator Ho are transmitted to the circuit G by way of an inhibit gate circuit 106 while a second inhibit gate 107 is connected between gate 106 and the oscillator means C for transmitting the pulses from the oscillator means C to the counting means 89.

Assuming that, for example, as shown in FIG. 20, when four pulses are applied as an input to the means G, an output signal will be obtained through the change-over switch 105, then during application of an input of 1-3 pulses, the inhibit gate circuits 106 and 107 are maintained open so that the oscillation pulses of the oscillator means C at this time are supplied to the counter 89. When the fourth pulse from the generating means Ho has been delivered to the memory signal stopping circuit G, the third counting element of the binary counter 103 provides an output 1, so that through the change-over switch 105 an output signal is supplied to the inhibit gate circuits 106 and 107, thus closing these inhibit gate circuits. As a result, the pulse input to the binary counter 103 through the inhibit gate circuit 106 and also the pulse input to the counter 89 are simultaneously stopped. The pulse input time of the counter 89 is thus determined by the memory signal stopping circuit G, and the pulse input time can be varied by setting the condition of the change-over switch 105, so that the interval during which the counter 89 operates to count pulses from the oscillator means C can be controlled by such an adjustment. Thus, the time when a flash-stopping signal will be produced can be accurately determined by adjustment of the change-over switch 105.

In the above example, the parameters such as exposure time, diagram aperture, and film speed are maintained constant. A flash control operation taking such parameter conditions into consideration is carried by adjusting the change-over switch 105 in accordance with the parameter values such as the diaphragm aperture or film speed.

Figure 21:
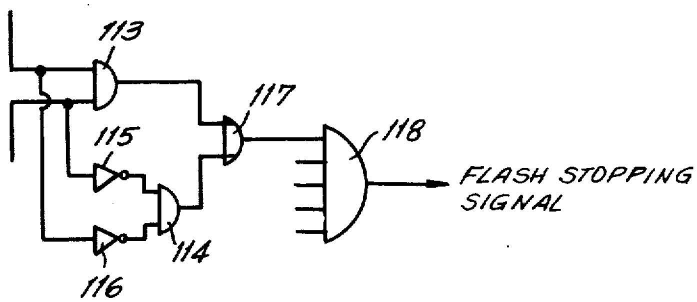
FIG. 21 is a schematic representation of the coincidence or comparing circuitry of FIG. 19.

FIG. 21 illustrates one possible example of a comparator or coincidence circuit means 91 forming part of the unit D which contains the counting means 89 and the flash-control means formed by the counting means 90 and the coincidence circuit means 91. As is shown in FIG. 21, the comparator circuit means 91 includes AND circuits 113 and 114, NOT circuits 115 and 116, and an OR circuit 117, these components being connected between the corresponding counting elements or stages of the counters 89 and 90. The output of each comparator circuit unit is supplied to an AND circuit 118 which produces the flash stopping signal when the values at the counters 89 and 90 are equal to each other. Comparator circuits of the type shown in FIG. 21 are well-known so that a further detailed description thereof is not necessary.

Figure 22:
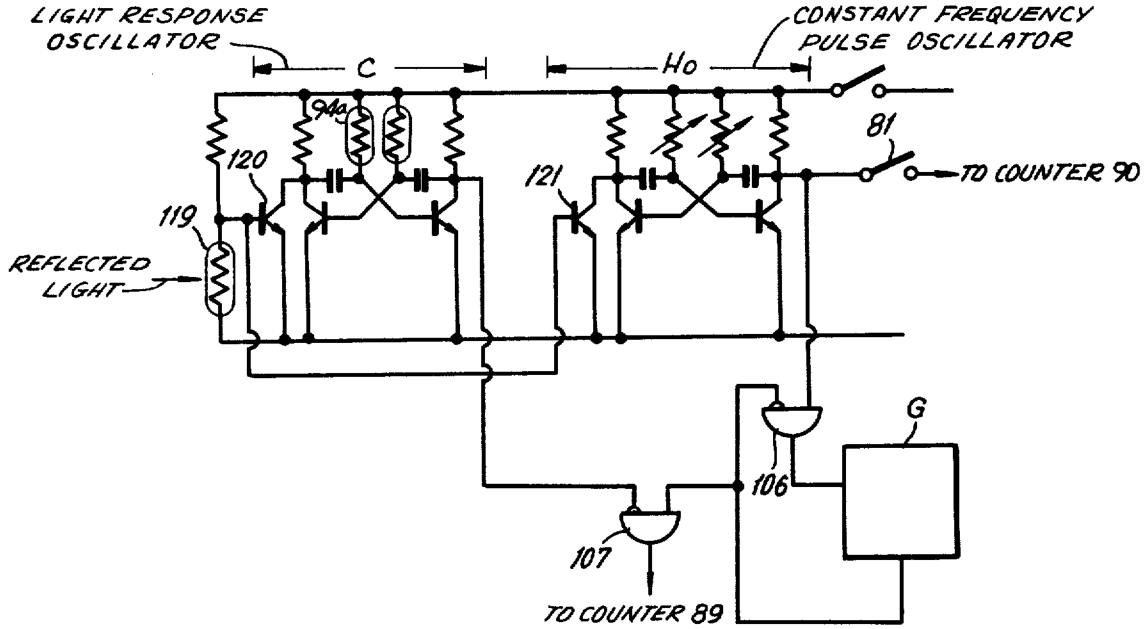
FIG. 22 shows another embodiment of details of part of the circuitry of FIG. 19.

FIG. 22 shows a further embodiment of structure which may be utilized for the oscillator means C and the constant-frequency reference pulse oscillator Ho. In this embodiment both of these units are formed by astable multivibrators and except for the use of such astable multivibrators the circuitry of FIG. 22 is substantially identical with that of FIG. 20. With the embodiment of FIG. 22 when there is no reflected light the internal resistance value of the photosensitive means 119 is relatively high so that transistors 120 and 121 are ON and the oscillators C and $H_o$ will not oscillate. When the light-sensitive element 119 receives reflected light its internal resistance value decreases so that transistors 120 and 121 are turned OFF and now the oscillators C and Ho will start oscillating. In FIG. 22 the pair of photosensitive elements 94a and 94b of the oscillator means C are situated at the viewfinder of the camera.

Figure 23:
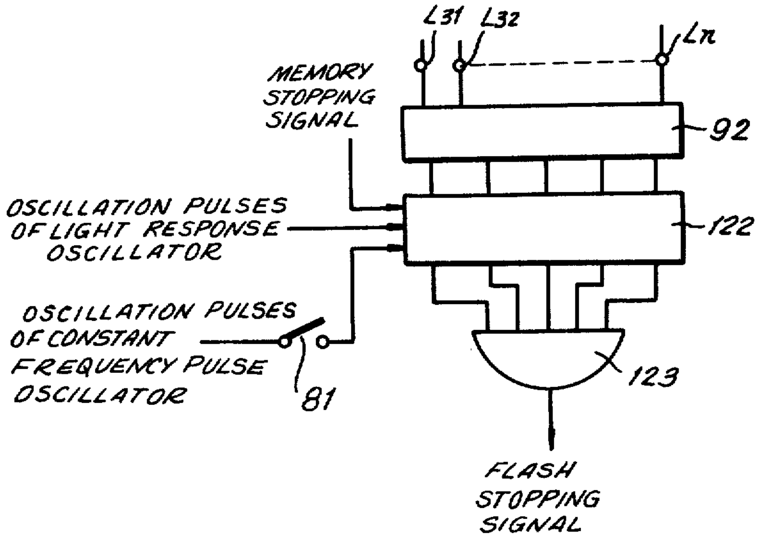
FIG. 23 also shows a further embodiment of part of the structure of FIG. 19.

FIG. 23 shows an example where the signal-generating circuit D includes only one counter. In this case pulses are derived from the oscillator C are counted by a counter 122 and this counter continues during the interval determined by the memory signal stopping circuit G. Then, in synchronism with the starting of the main flash illumination, the supply of pulses from the constant-frequency reference pulse oscillator Ho is initiated by closing of the switch 81 in synchronism with opening of the shutter, so that the counter 122 will also count the reference pulses in addition to the previously memorized value of pulses from the oscillator means C. As a result, the counter 122 will reach an output value 11111 . . . , whereupon the AND circuit 123 will respond by opening and thus the flash-terminating signal will be generated and transmitted to the flash means A to terminate the flash operation. Thus, in this example also the number of pulses counted from the constant-frequency reference pulse oscillator Ho is inversely proportional to the memorized value, so that the instant when the flash-terminating signal is generated will be earlier as the previously memorized value increases. In other words, the counter 122 will count a given total number of pulses before acting through the gate 123 in order to transmit the flash-terminating signal to the flash means. If one-half the total number of pulses which can be counted by the counter 122 is derived from the oscillator means C, then the remaining half will be derived from the reference pulse oscillator Ho, and it is only in this special case that the number of reference pulses will equal the number of pulses from the oscillator means C. In all other cases, if the number of pulses counted from the oscillator means C is less than half the total number of pulses capable of being counted by the counter 122, then the remaining number of reference pulses will make up the total and will be more than half while on the other hand if more than half the capacity of total pulses which can be counted at the counter means 122 come from the oscillator C, then the remainder which is less than half will come from the reference pulse oscillator Ho, so that in all cases a proper duration for the flash exposure will be automatically provided. In other words, at relatively high frequencies of pulses from the oscillator C during relatively high intensity reflected light from the object only a small part of the total of pulses counted by the counting means 122 will be in the form of the reference pulses so that a short duration of flash illumination will be provided whereas with relatively weak reflected light the pulses from the oscillator C will form only a small number of the total pulses so that reference pulses will provide a relatively long duration for the flash means. Thus in the embodiment of FIG. 23 it will be seen that the single counter 122 forms in part a portion of the means for counting pulses from the oscillator C and in part a portion of the flash-control means which in response to the number of pulses derived from the oscillating means C provides the flash-terminating signal.

Figure 24:
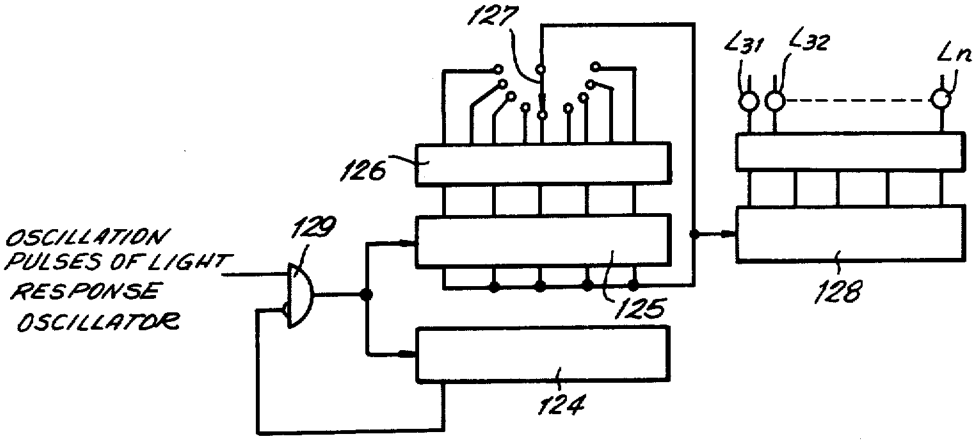
FIG. 24 illustrates yet another embodiment of part of the structure of FIG. 19.

FIG. 24 shows an embodiment where the memory signal stopping circuit G is formed by an n-radix notation counter. FIG. 24 illustrates a binary subtraction counter 124, a binary addition counter 125, a decoder 126, and a change-over switch 127 connected through the decoder 126 to the counter 125. Also FIG. 24 shows a memorizing counter 128 of the signal-generating circuit D. The inhibit gate circuit 129 of FIG. 24 is open when receiving the output of the counter 124, so that pulses of the light-responsive oscillator means C are supplied simultaneously to the counters 124 and 125. The counter 125 starts counting as a result of the application of this pulse input. When the counting reaches the value determined by the setting of the change-over switch 127, a feedback of the output is provided through the switch 127, and the counter 125 is reset. Upon resetting of the counter 125, an output pulse is delivered to the counter 128. The counter 125 starts counting again whenever receiving a reset pulse from the switch 127, and when the value determined by the setting of the switch 127 is again reached, the counter 125 is again reset and an additional output pulse is delivered to the counter 128. While this counting operation is repeated cyclically in the above manner, the counter 124 will reach an output 0000 . . . so that the inhibit gate circuit 129 will now close and passage of pulses from the light responsive oscillator C is prevented. The output pulses delivered each time the counting operation of the counter 125 is repeated are memorized by the counter 128.

In the example of FIG. 24, the illumination provided by way of the preparatory flash plus the ambient illumination at the object are memorized by the first digital memory 128 so that flash control operation can be made taking into consideration not only the preliminary flash illumination but also the amount of light initially available at the object. Thus whatever the initial ambient brightness at the object to be photographed, with synchronization it is always possilbe to carry out a proper flash operation in accordance with the brightness or intensity of light reflected from the object to the oscillating means C, so as to achieve the great advantage for a flash control apparatus of a system for detecting by way of a preparatory flash illumination light travelling along the photographic light path through the objective to a photosensitive element at the viewfinder. Inasmuch as devices such as the indicating lamps $L_{31}$, $L_{32}$. . . $L_n$ are provided at the output ends of the circuit elements or stages of the first digital memory device 128, the operator can know the memorized value resulting from the preparatory flash operation and if necessary can make suitable changes in the photographing conditions. Thus it is possible in this way very effectively to check whether or not there is sufficient flash illumination to reach the object so as to provide a proper exposure. Of course, with the embodiment of FIG. 24 the counter 128 corresponds to the counter 89 of FIG. 19 and this counter 128 in the same way as the counter 89 can be connected through a suitable coincidence or comparing circuit means 91 with the counter 90 which receives the reference pulses from the reference pulse generating means Ho.

While in the above examples the counter 89 or the counter 128 are of the addition type while the counter 90 is of the subtraction type, it is possible also to achieve the desired results if counter 89 or counter 128 is of the subtraction type and the counter 90 which receives the reference pulses is of the addition type.

As pointed out above, in accordance with the invention the flash control apparatus is constituted by a means which will determine frequency such as frequency according to distance to the object or frequency according to the intensity of light reflected from the object, and a pulse oscillator will provide oscillation with a proper frequency while a digital memory receives and counts the pulses during a given interval. The output of this memory device corresponding to a given number of pulses counted during a given time interval is then utilized to operate the flash control means which will terminate the main flash illumination after the latter has provided a proper exposure for the film. Thus, the apparatus of the invention can include digital circuits so that the time during which the flash illumination is provided will not fluctuate as result of variations in source voltage or ambient temperature. Furthermore, while the capacitor of a conventional integrator circuit cannot provide accurate flash-terminating signals due to leakage, with the present invention the latter drawback is eliminated and it is always possible to provide proper flash controls.

It is also possible with this invention to utilize pulse frequencies which are very high, in accordance with factors such as distance to the object or the intensity of the reflected light, so that it becomes possible to carry out accurate flash control even when the time between starting and terminating of the flash illumination is extremely short as in the case where the object is at a relatively short distance from the flash apparatus or camera or in the case where the nature of the object is such that a light of high intensity is reflected therefrom.

Furthermore, according to the present invention, the indicating means formed by the lamps, for example, are attached to the digital memory device so that when the discharge flash is, for example, insufficient to reach the object the operator will know that such a condition exists by observing the indicating means. As a result of this observation the operator can carry out the photographing operation in such a way that a proper exposure will be assured. The pulse frequency determined according to the distance to the object or the intensity of the reflected light can readily be varied by way of a frequency divider, a rotary switch, etc., so that adjustment of the flash duration can be carried out so as to take into account photographic parameters such as the exposure aperture provided by the diaphragm, the sensitivity of the film which is exposed, etc.

It is apparent from FIG. 9 that the AND circuits $a_{11}$, $a_{12}$, etc. illustrated therein are not essential inasmuch as the oscillators could be directly connected through the switches $S_{11}$, $S_{12}$, etc. directly to the OR circuit 31 or even without the latter directly to frequency divider 33 through the switch 32, as is in fact the case in FIG. 10. However this circuitry is included in FIG. 9 so that the latter can readily be adapted to form an arrangement as shown in FIG. 11.

Also, it is apparent from FIGS. 11 and 13 that the switches 32 and 32' are not both required inasmuch as each switch by itself will accomplish the desired results. The separate switches are shown only for convenience so that the operator will have different switches for preliminary and main flash operations.

Furthermore, any of the counters can be connected through the decoders not only to the lamps but also to the change-over switches, as indicated in FIG. 8.

What is claimed is:

1. In an electronic flash apparatus, flash means for providing flash illumination, oscillator means for providing pulses during operation of said flash means, counting means operatively connected with said oscillator means for counting said pulses, terminating means operatively connected with said counting means for selectively terminating operation thereof according to one or more parameters such as film speed, diaphragm aperture, and the like, and flash control means operatively connected with said flash means for controlling the extent of flash illumination provided thereby, said counting means and said terminating means forming a pair of means one of which is operatively connected with said flash control means for operating the latter, said oscillator means including a photosensitive means for responding to light, including flash illumination provided by said flash means, for providing in response to the intensity of the light received by said photosensitive means pulses the frequency of which is directly proportional to said intensity.

2. The combination of claim 1 and wherein said terminating means is connected to said counting means for terminating the operation thereof when a given number of pulses have been counted thereby, whereby the time required for counting said number of pulses is shorter at higher light intensities as compared to lower light intensity, said flash control means being operatively connected with said terminating means for responding to termination of the operation of said counting means by said terminating means when said given number of pulses have been counted for controlling said flash means to discontinue flash illumination when said given number of pulses have been counted by said counting means.

3. The combination of claim 1 and wherein an adjusting means forms part of a camera for adjusting one of said parameters, and means operatively connected with said terminating means and with said adjusting means for automatically setting said terminating means to bring about termination of the operation of said counting means according to the selected adjustment of said parameter by said adjusting means.

4. The combination of claim 3 and wherein said adjusting means adjusts the diaphragm aperture of the camera.

5. The combination of claim 1 and wherein said oscillator means is in the form of a sine wave oscillator.

6. The combination of claim 1 and wherein an adjusting means is operatively connected with said oscillator means for adjusting the latter according to one of said parameters.

7. The combination of claim 1 and wherein a frequency divider means is situated between and operatively connected with said oscillator means and counting means and said frequency divider means influencing the transmission of information from said oscillator means to said counting means according to one of said parameters.

8. In an electronic flash aparatus, flash means for providing flash illumination, oscillator means for providing pulses during operation of said flash means, counting means operatively connected with said oscillator means for counting said pulses, terminating means operatively connected with said counting means for selectively terminating operation thereof according to one or more parameters such as film speed, diaphragm aperture, and the like, and flash control means operatively connected with said flash means for controlling the extent of flash illumination provided thereby, said counting means and said terminating means forming a pair of means one of which is operatively connected with said flash control means for operating the latter, an indicating means being operatively connected with said counting means for indicating to the operator whether or not said flash means has provided flash illumination sufficient for said counting means to operate until said terminating means terminates the operation thereof.

9. In an electronic flash apparatus, flash means for providing flash illumination, oscillator means for providing pulses during operation of said flash means, counting means operatively connected with said oscillator means for counting said pulses, terminating means operatively connected with said counting means for selectively terminating operation thereof according to one or more parameters such as film speed, diaphragm aperture, and the like, and flash control means operatively connected with said flash means for controlling the extent of flash illumination provided thereby, said counting means and said terminating means forming a pair of means one of which is operatively connected with said flash control means for operating the latter, said oscillating means including a selecting means available to the operator for manually selecting the frequency of pulses provided by said oscillating means according to the distance of the object from said flash means with the selected frequency being inversely proportional to said distance.

10. The combination of claim 9 and wherein said oscillating means includes a plurality of separate oscillating units which respectively provide pulses at different frequencies so that one of said units is available for selection by the operator according to the distance of the object from said flash means.

11. The combination of claim 9 and wherein said oscillating means includes a single oscillating unit and said selecting means includes an adjusting means connected with said single unit for adjusting the latter to provide a selected frequency according to the distance of the object from said flash means.

12. The combination of claim 9 and wherein an indicating means is operatively connected with said counting means for indicating to the operator whether or not the pulse frequency has been accurately selected according to the distance of the object from said flash means.

13. The combination of claim 12 and wherein said flash means is operable for providing first a preliminary flash and then a main flash to be utilized during film exposure, and photosensitive means for responding to said preliminary flash and operatively connected with said counting means and through the latter with said indicating means for actuating the latter to indicate to the operator the pulse frequency to be selected according to the distance of the object from said flash means.

14. In an electronic flash apparatus, flash means for providing flash illumination, oscillator means for providing pulses during operation of said flash means, counting means operatively connected with said oscillator means for counting said pulse, terminating means operatively connected with said counting means for selectively terminating operation thereof according to one or more parameters such as film speed, diaphragm aperture, and the like, and flash control means operatively connected with said flash means for controlling the extent of flash illumination provided thereby, said counting means and said terminating means forming a pair of means one of which is operatively connected with said flash control means for operating the latter, said oscillating means providing pulses at a number of different constant frequencies one of which is to be selected according to the distance of the object from said flash means, and photosensitive means responding to operation of said flash means and operatively connected with said oscillating means for automatically selecting a frequency for the pulses produced by said oscillating means which is proper according to the distance of the object from said flash means.

15. The combination of claim 14 and wherein an indicating means is operatively connected with said counting means for indicating to the operator when the conditions are such that a proper exposure cannot be made, so that the operator then can change the conditions to achieve a proper exposure.

16. The combination of claim 14 and wherein said means for automatically selecting said pulse frequency of said oscillating means includes a photosensitive converting circuit means responding to flash illumination for converting the latter into a given signal, and selecting circuit means connected between said converting circuit means and said oscillating means for responding to said signal of said converting circuit means for automatically selecting at said oscillating means a pulse frequency according to said signal and thus according to the distance of the object from said flash means.

17. The combination of claim 14 and wherein said means for automatically selecting pulse frequency responds automatically to light, including flash illumination, reflected from the object for progressively changing the selected pulse frequency from a lesser pulse frequency to progressively higher pulse frequencies according to the light intensity.

18. In an electronic flash apparatus, flash means for providing flash illumination, oscillator means for providing pulses during operation of said flash means, counting means operatively connected with said oscillator means for counting said pulses, terminating means operatively connected with said counting means for selectively terminating operation thereof according to one or more parameters such as film speed, diaphragm aperture, and the like, and flash control means operatively connected with said flash means for controlling the extent of flash illumination provided thereby, said counting means and said terminating means forming a pair of means one of which is operatively connected with said flash control means for operating the latter, said flash means providing first a preliminary flash illumination and thereafter a main flash illumination to be utilized during actual film exposure, said counting means counting the pulses provided by said oscillating means during preliminary flash illumination, and said counting means memorizing the number of pulses counted by said counting means upon termination of the operation thereof by said terminating means, said flash control means being operatively connected with said counting means to be controlled thereby and including a reference pulse means for providing reference pulses of a given constant frequency during film exposure while said flash means provides said main flash illumination, and said flash control means including a comparing means for comparing the reference pulses produced by said reference pulse means and the number of pulses counted by said counting means for actuating said flash means to terminate main flash illumination when the reference pulses have a given relationship with respect to the pulses counted by said counting means according to the preliminary flash illumination.

19. The combination of claim 18 and wherein said oscillating means provides different constant frequencies according to the distance of the object from said flash means, and photosensitive selecting means responding also to preliminary flash illumination for automatically selecting at least one of said constant frequencies.

20. The combination of claim 18 and wherein said oscillating means includes a photosensitive means responding to preliminary flash illumination for operating said oscillating means to provide automatically a pulse frequency which is directly proportional to light intensity received by said photosensitive means.

* * * * *